(12) United States Patent
Miller et al.

(10) Patent No.: US 12,061,779 B2
(45) Date of Patent: Aug. 13, 2024

(54) APPLICATION CUSTOMIZATION USING A CUSTOMIZATION FILE

(71) Applicant: LIVEPERSON, INC., New York, NY (US)

(72) Inventors: Grant Lawrence Miller, Los Angeles, CA (US); Marc Campbell, Los Angeles, CA (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/873,410

(22) Filed: Jul. 26, 2022

(65) Prior Publication Data
US 2023/0073482 A1   Mar. 9, 2023

Related U.S. Application Data

(63) Continuation of application No. 17/154,624, filed on Jan. 21, 2021, now Pat. No. 11,442,604, which is a
(Continued)

(51) Int. Cl.
*G06F 3/0484*   (2022.01)
*G06F 3/0482*   (2013.01)
(Continued)

(52) U.S. Cl.
CPC .......... *G06F 3/0484* (2013.01); *G06F 3/0482* (2013.01); *G06F 3/04842* (2013.01);
(Continued)

(58) Field of Classification Search
CPC ... G06F 3/0484; G06F 3/0482; H04L 51/046; H04L 67/06; H04L 67/34
See application file for complete search history.

(56) References Cited

U.S. PATENT DOCUMENTS 7,555,538 B2     6/2009   Shenfielf et al.
8,565,411 B2 *  10/2013   Kannan .................. H04L 51/04
                                                          379/266.02
(Continued)

OTHER PUBLICATIONS

Non-Final Office Acton of Jun. 10, 2015 for U.S. Appl. No. 14/586,600, 17 pages.
(Continued)

*Primary Examiner* — Anil K Bhargava
(74) *Attorney, Agent, or Firm* — POLSINELLI LLP

(57) ABSTRACT

Techniques and systems for receiving and using a customization file are provided, including a computing device, a method, or a computer-program product. For example, a method may include receiving a customization file that includes customized content for customizing a communication interface overlay. The method may further include accessing native application code and executing the native application code to run a native application. The method may further include accessing a compiled set of code that is separate from the native application code. The compiled set of code is accessible by the native application code. The method may further include executing the compiled set of code, wherein a default file of the compiled set of code provides a native communication interface overlay, wherein the native communication interface overlay is overlaid over a graphical interface of the native application, and wherein the native communication interface overlay allows communication with a resource of a third-party. The method may further include executing the received customization file, wherein executing the received customization file customizes the compiled set of code, and wherein the customized compiled set of code customizes the native communication interface overlay to provide a customized communication interface overlay.

18 Claims, 18 Drawing Sheets

Related U.S. Application Data continuation of application No. 16/261,668, filed on Jan. 30, 2019, now Pat. No. 10,936,167, which is a continuation of application No. 15/441,464, filed on Feb. 24, 2017, now Pat. No. 10,228,827, said application No. 14/586,690 is a continuation of application No. 14/586,600, filed on Dec. 30, 2014, now Pat. No. 9,191,492, said application No. 15/441,464 is a continuation of application No. 14/586,690, filed on Dec. 30, 2014, now Pat. No. 9,619,121.

(51) Int. Cl.

| | |
|---|---|
| *G06F 3/04842* | (2022.01) |
| *G06F 3/0488* | (2022.01) |
| *G06Q 30/00* | (2023.01) |
| *G06Q 30/016* | (2023.01) |
| *H04L 51/046* | (2022.01) |
| *H04L 67/00* | (2022.01) |
| *H04L 67/06* | (2022.01) |
| *H04M 1/724* | (2021.01) |
| *H04M 1/72469* | (2021.01) |
| *H04M 1/00* | (2006.01) |

(52) U.S. Cl.
CPC ........... *G06F 3/0488* (2013.01); *G06Q 30/00* (2013.01); *G06Q 30/016* (2013.01); *H04L 51/046* (2013.01); *H04L 67/06* (2013.01); *H04L 67/34* (2013.01); *H04M 1/724* (2021.01); *H04M 1/72469* (2021.01); *H04M 1/006* (2013.01)

(56) References Cited

U.S. PATENT DOCUMENTS

| | | |
|---|---|---|
| 9,191,592 B2 | 11/2015 | Miller et al. |
| 9,616,121 B2 | 4/2017 | Miller et al. |
| 10,228,827 B2 | 3/2019 | Miller et al. |
| 10,936,167 B2 | 3/2021 | Miller et al. |
| 11,442,604 B2 | 9/2022 | Miller et al. |
| 2004/0177112 A1 | 9/2004 | Goodwin et al. |
| 2004/0215700 A1 | 10/2004 | Shenfield et al. |
| 2007/0265873 A1* | 11/2007 | Sheth .................. G06Q 30/016 705/304 |
| 2008/0298566 A1* | 12/2008 | Scott ...................... H04L 51/04 379/93.01 |
| 2009/0003579 A1* | 1/2009 | Singh .................. H04M 3/4938 379/211.01 |
| 2009/0254843 A1 | 10/2009 | Van Wie et al. |
| 2009/0276730 A1 | 11/2009 | Aybes et al. |
| 2009/0287497 A1* | 11/2009 | Brown .................. G06Q 30/016 705/304 |
| 2010/0262549 A1* | 10/2010 | Kannan .............. G06Q 30/0613 707/769 |
| 2011/0158398 A1* | 6/2011 | Kannan ............... H04M 3/5191 379/265.09 |
| 2012/0158472 A1 | 6/2012 | Singh |
| 2012/0266258 A1* | 10/2012 | Tuchman ................ H04L 67/51 726/28 |
| 2013/0148800 A1* | 6/2013 | Lyman ................ H04M 3/5141 379/265.04 |
| 2013/0190013 A1* | 7/2013 | Moshrefi ............. H04M 3/5237 455/456.2 |
| 2014/0022328 A1* | 1/2014 | Gechter ................. G06Q 30/06 348/14.02 |
| 2014/0164257 A1* | 6/2014 | Brown ................. G06Q 30/016 705/304 |
| 2014/0317155 A1 | 10/2014 | Theiback-Heck |
| 2014/0365908 A1 | 12/2014 | Smoak |
| 2015/0193286 A1 | 7/2015 | Michael et al. |
| 2015/0200921 A1 | 7/2015 | Linga et al. |
| 2016/0188140 A1 | 6/2016 | Miller et al. |

OTHER PUBLICATIONS

Notice of Allowance of Jul. 17, 2015 for U.S. Appl. No. 14/586,600, 10 pages.
Notice of Allowance of Nov. 30, 2016 for U.S. Appl. No. 14/586,690, 9 pages.
Notice of Allowance of Oct. 31, 2018 for U.S. Appl. No. 15/441,464, 9 pages.
Notice of Allowance of Oct. 23, 2020 for U.S. Appl. No. 16/261,668, 10 pages.
Non-Final Office Action of Dec. 14, 2021 for U.S. Appl. No. 17/154,624, 11 pages.
Notice of Allowance of Apr. 29, 2022 for U.S. Appl. No. 17/154,624, 10 pages.

\* cited by examiner

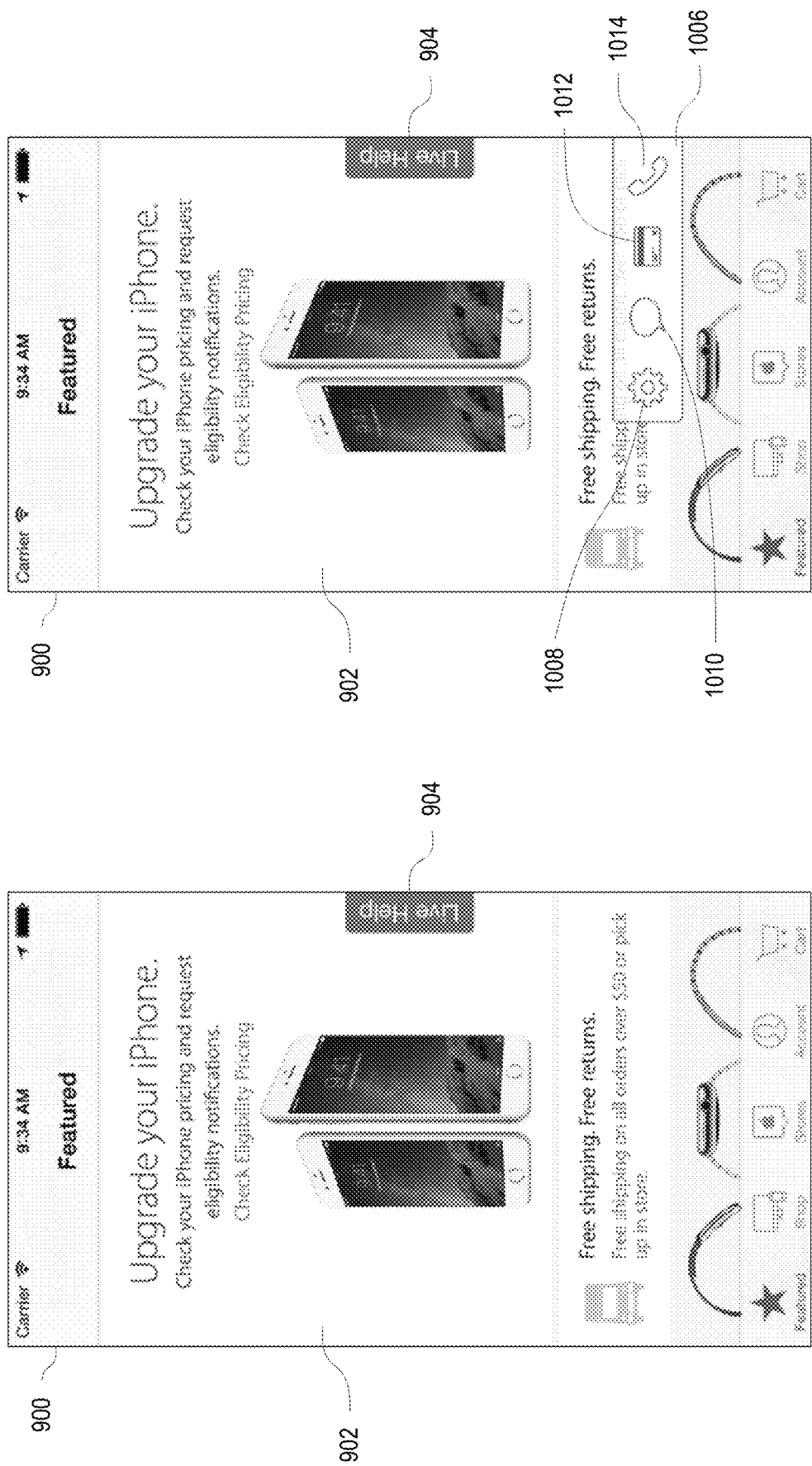

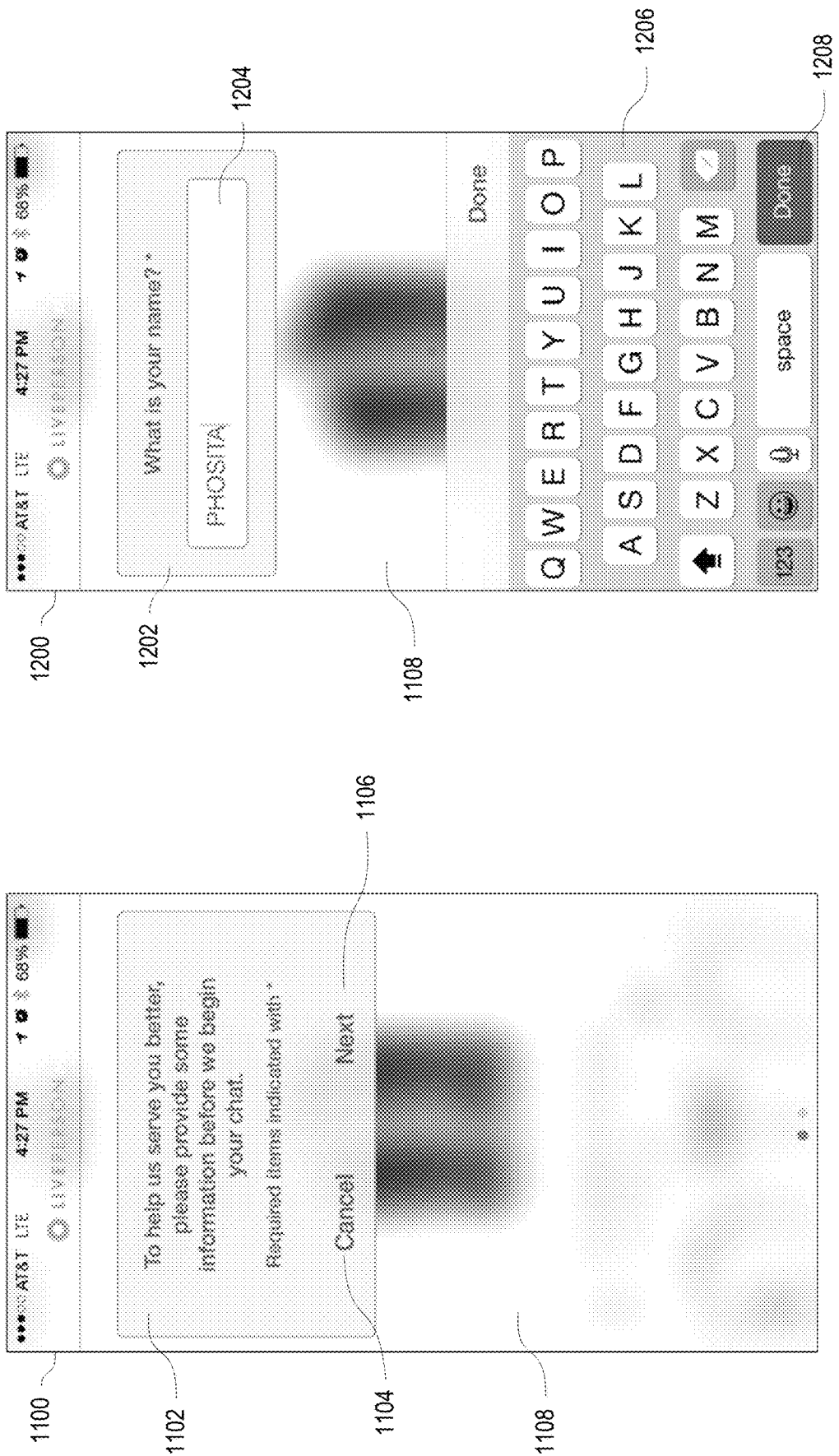

2000

DISPLAY A GRAPHICAL INTERFACE CORRESPONDING TO A MOBILE APPLICATION, WHEREIN THE GRAPHICAL INTERFACE INCLUDES A SELECTABLE PHONE COMMUNICATION LINK OR A SELECTABLE CHAT LINK, WHEREIN SELECTION OF THE SELECTABLE PHONE COMMUNICATION LINK FACILITATES A TELEPHONE COMMUNICATION WITH A LIVE RESOURCE, AND WHEREIN SELECTION OF THE SELECTABLE CHAT LINK FACILITATES A CHAT COMMUNICATION WITH A LIVE CHAT RESOURCE
2002

↓

RECEIVE INPUT CORRESPONDING TO AN INDICATION OF PLACEMENT OF A TELEPHONE CALL FROM THE APPLICATION, WHEREIN THE SELECTABLE PHONE COMMUNICATION LINK IS USED TO PLACE THE TELEPHONE CALL
2004

↓

DETERMINE A STATE OF THE SELECTABLE CHAT LINK WHEN THE SELECTABLE PHONE COMMUNICATION LINK WAS USED TO PLACE THE TELEPHONE CALL FROM THE APPLICATION
2006

↓

REPORT A COMMUNICATION, WHEREIN THE COMMUNICATION INCLUDES DATA INDICATING PLACEMENT OF THE TELEPHONE CALL AND THE STATE OF THE SELECTABLE CHAT LINK WHEN THE SELECTABLE PHONE COMMUNICATION LINK WAS SELECTED
2008

FIG. 20

APPLICATION CUSTOMIZATION USING A CUSTOMIZATION FILE

CROSS-REFERENCE TO RELATED APPLICATIONS

This application is a continuation of U.S. patent application Ser. No. 17/154,624 filed Jan. 21, 2021, which is a continuation of U.S. patent application Ser. No. 16/261,668 filed Jan. 30, 2019, which is a continuation of U.S. patent application Ser. No. 15/441,464 filed Feb. 24, 2017, which is a continuation of U.S. patent application Ser. No. 14/586,690 filed Dec. 30, 2014, which is a continuation of U.S. application Ser. No. 14/586,600 filed Dec. 30, 2014. The subject matter of all of the foregoing patent applications is incorporated herein by reference in its entirety, for all purposes.

FIELD

The present disclosure relates generally to customizing an application. For example, various techniques and systems are provided for using a customization file to customize an application program.

SUMMARY

Certain aspects and features of the present disclosure relate to deflecting certain types of communications. In some examples, interactions with a graphical interface of an application may be detected along with a configuration state of the graphical interface when the interactions are made. In some embodiments, one or more metrics may be gathered and analyzed to determine communications traffic patterns that are attributable to different configurations of the graphical interface.

In some examples, a customized communication interface overlay may be displayed over a graphical interface (e.g., of a website or a computer application). For example, a specifically customized file may be transmitted to a computing device. The specifically customized file may also be referred to herein as a customization file or a customization overlay file. The customization file may be executed by the computing device to customize a native communication interface overlay.

According to at least one example of facilitating deflection of communications, a computing device may be provided that includes one or more data processors. The computing device further includes a non-transitory machine-readable storage medium containing instructions which when executed on the one or more data processors, cause the one or more processors to perform operations including: displaying a graphical interface corresponding to a mobile application, wherein the graphical interface includes a selectable phone communication link or a selectable chat link, wherein selection of the selectable phone communication link facilitates a telephone communication with a live resource, and wherein selection of the selectable chat link facilitates a chat communication with a live chat resource; receiving input corresponding to an indication of placement of a telephone call from the mobile application, wherein the selectable phone communication link is used to place the telephone call; determining a state of the selectable chat link when the selectable phone communication link was used to place the telephone call from the mobile application; and reporting a communication, wherein the communication includes data indicating placement of the telephone call and the state of the selectable chat link when the selectable phone communication link was selected.

In some embodiments, a computer-implemented method may be provided that includes displaying, using a computing device, a graphical interface corresponding to a mobile application, wherein the graphical interface includes a selectable phone communication link or a selectable chat link, wherein selection of the selectable phone communication link facilitates a telephone communication with a live resource, and wherein selection of the selectable chat link facilitates a chat communication with a live chat resource. The method further includes receiving input corresponding to an indication of placement of a telephone call from the mobile application, wherein the selectable phone communication link is used to place the telephone call. The method further includes determining a state of the selectable chat link when the selectable phone communication link was used to place the telephone call from the mobile application and reporting a communication, wherein the communication includes data indicating placement of the telephone call and the state of the selectable chat link when the selectable phone communication link was selected.

In some embodiments, a computer-program product tangibly embodied in a non-transitory machine-readable storage medium of a computing device may be provided. The computer-program product may include instructions configured to cause one or more data processors to: display a graphical interface corresponding to a mobile application, wherein the graphical interface includes a selectable phone communication link or a selectable chat link, wherein selection of the selectable phone communication link facilitates a telephone communication with a live resource, and wherein selection of the selectable chat link facilitates a chat communication with a live chat resource; receive input corresponding to an indication of placement of a telephone call from the mobile application, wherein the selectable phone communication link is used to place the telephone call; determine a state of the selectable chat link when the selectable phone communication link was used to place the telephone call from the mobile application; and report a communication, wherein the communication includes data indicating placement of the telephone call and the state of the selectable chat link when the selectable phone communication link was selected.

In some embodiments, the state of the selectable chat link includes present in the graphical interface or not present in the graphical interface.

In some embodiments, the method, computing device, and computer-program product described above for facilitating deflection of communications may further include determining a percentage of call deflections as a result of the selectable chat link, wherein the percentage of call deflections is determined based on a first percentage of selections of selectable phone communication links when the selectable chat link is in a first state, and a second percentage of selections of the selectable phone communication links when the selectable chat link is in a second state.

In some embodiments, the method, computing device, and computer-program product may include receiving input corresponding to an indication of placement of a chat communication from the mobile application, determining that the selectable chat link was selected to place the chat communication, and reporting a second communication, wherein the second communication includes data indicating placement of the chat communication.

In some embodiments, the method, computing device, and computer-program product include determining that the selectable phone communication link was used to place the telephone call based on the placement of the telephone call occurring from the mobile application.

In some embodiments, the live chat resource includes particular information about a subject corresponding to the mobile application, and wherein a provider of the live chat resource is different from a provider of the mobile application.

In some embodiments, the method, computing device, and computer-program product include reporting a length of time of the telephone call.

According to at least one example of customizing a communication interface overlay, a computing device may be provided that includes one or more data processors, and a receiver configured to receive a customization file, wherein the customization file includes customized content for customizing a communication interface overlay. The computing device further includes a non-transitory machine-readable storage medium containing instructions which when executed on the one or more data processors, cause the one or more processors to perform operations including accessing native application code; executing the native application code to run a native application; accessing a compiled set of code, wherein the compiled set of code is separate from the native application code, and wherein the compiled set of code is accessible by the native application code; executing the compiled set of code, wherein a default file of the compiled set of code provides a native communication interface overlay, wherein the native communication interface overlay is overlaid over a graphical interface of the native application upon execution of the compiled set of code, and wherein the native communication interface overlay facilitates communication with a resource of a third-party; and executing the received customization file, wherein executing the received customization file customizes the compiled set of code, and wherein the customized compiled set of code customizes the native communication interface overlay to provide a customized communication interface overlay.

In some embodiments, a computer-implemented method may be provided that includes receiving, on a computing device, a customization file, wherein the customization file includes customized content for customizing a communication interface overlay. The method further includes accessing native application code and executing the native application code to run a native application. The method further includes accessing a compiled set of code, wherein the compiled set of code is separate from the native application code, and wherein the compiled set of code is accessible by the native application code, and executing the compiled set of code, wherein a default file of the compiled set of code provides a native communication interface overlay, wherein the native communication interface overlay is overlaid over a graphical interface of the native application, and wherein the native communication interface overlay facilitates communication with a resource of a third-party. The method further includes executing the received customization file, wherein executing the received customization file customizes the compiled set of code, and wherein the customized compiled set of code customizes the native communication interface overlay to provide a customized communication interface overlay.

In some embodiments, a computer-program product tangibly embodied in a non-transitory machine-readable storage medium of a computing device may be provided. The computer-program product may include instructions configured to cause one or more data processors to: receive a customization file, wherein the customization file includes customized content for customizing a communication interface overlay; access native application code; execute the native application code to run a native application; access a compiled set of code, wherein the compiled set of code is separate from the native application code, and wherein the compiled set of code is accessible by the native application code; execute the compiled set of code, wherein a default file of the compiled set of code provides a native communication interface overlay, wherein the native communication interface overlay is overlaid over a graphical interface of the native application, and wherein the native communication interface overlay facilitates communication with a resource of a third-party; and execute the received customization file, wherein executing the received customization file customizes the compiled set of code, and wherein the customized compiled set of code customizes the native communication interface overlay to provide a customized communication interface overlay.

In some embodiments, the method, computing device, and computer-program product described above for customizing a communication interface overlay may further include accessing the default file, wherein the default file is included in the compiled set of code, determining whether the received customization file is different than the default file, and replacing the default file with the received customization file when the received customization file is different than the default file.

In some embodiments, the compiled set of code includes a stand-alone library. In some embodiments, the compiled set of code is accessed and executed and the customization file is executed when the native application code is provided by a particular client and the compiled set of code and the customization file are provided by the third-party. In such embodiments, the native application code is provided by the particular client, and the compiled set of code and the customization file are provided by the third-party.

In some embodiments, the resource of the third-party includes particular information about a subject. In some embodiments, the customized communication interface overlay facilitates communication between a customer of a particular client and the resource of the third-party. In some embodiments, the customized communication interface overlay includes an interactive chat window.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 9 is a depiction of a demonstration screen with a graphical interface and a communication interface overlay tab displayable on a computing device according to one embodiment.

FIG. 10 is a depiction of a demonstration screen with a graphical interface and a communication interface overlay tab displayable on a computing device according to one embodiment.

FIG. 11 is a depiction of a screen with a pre-chat survey window displayable on a computing device according to one embodiment.

FIG. 12 is a depiction of a screen with a name entry window displayable on a computing device according to one embodiment.

FIG. 20 is a flowchart illustrating an embodiment of a process of customizing a communication interface overlay.

DETAILED DESCRIPTION

Figure 1:
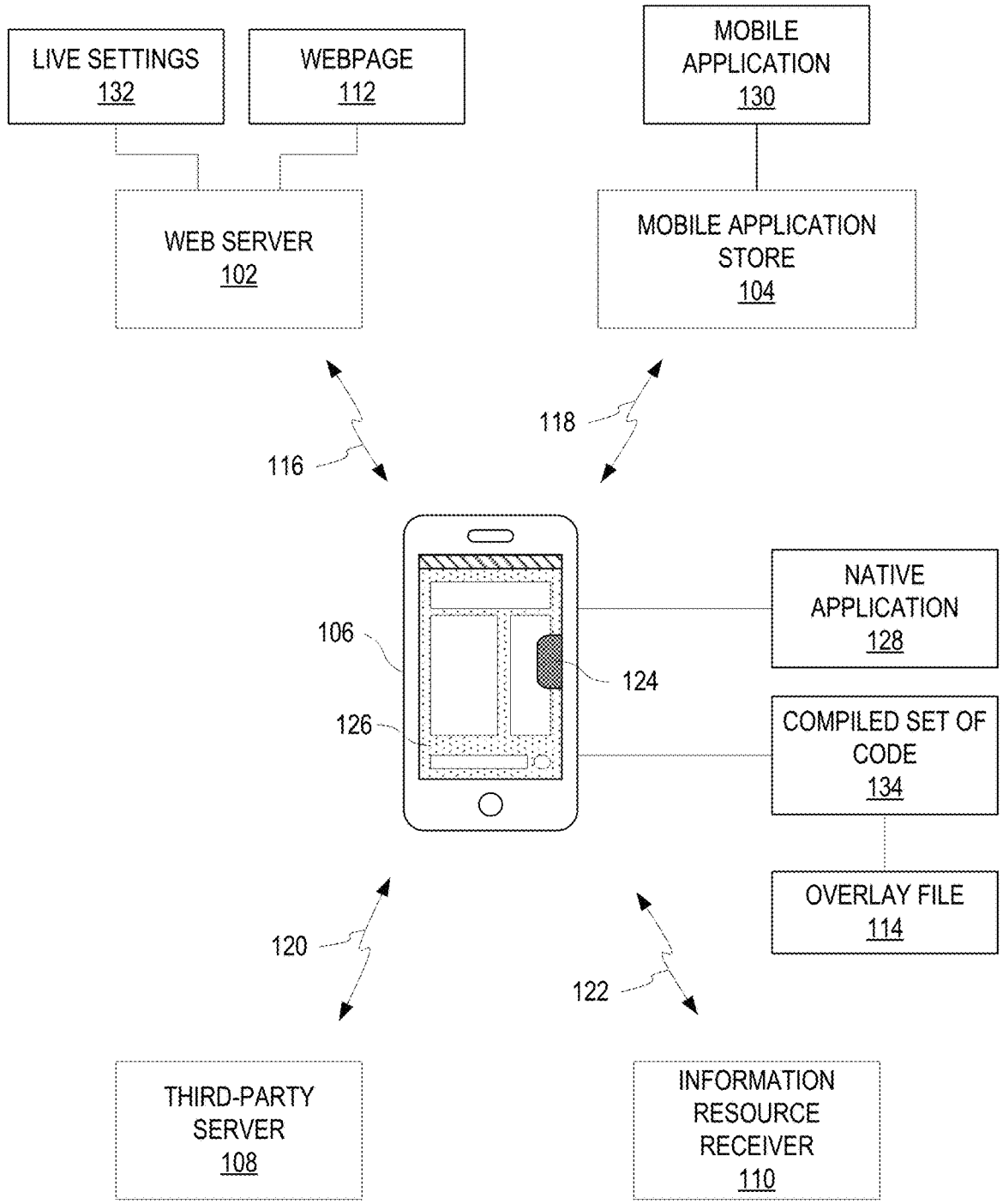
FIG. 1 is a block diagram of an environment according to one embodiment.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Certain aspects and features of the present disclosure relate to deflecting certain types of communications. For example, a third-party service provider may provide customer service, technical support, sales support, or other third-party services to a client of the third-party service provider. The client or the third-party service provider may desire that the client's customers contact support resources using one communication type over another communication type. For example, the client may prefer that the customers use a chat communication option over a telephone communication option. As used herein, a resource may include a customer service representative, a technical support representative, a sales representative, or other resources that are knowledgeable about a particular client's products or services. The resource may include a live person who has knowledge about products or services, an automated system, a combination of live human and automated system support, or the like. As used herein, a live resource or live chat resource includes a human resource that is able to communicate with a customer using telephonic communications or chat communications, respectively. In some examples, interactions with a graphical interface of a computer application (e.g., provided by the client, provided by the third-party service provider, or provided by another application provider) may be detected along with a configuration state of the graphical interface when the interactions are made. One or more metrics may be gathered and analyzed to determine communications traffic patterns that are attributable to different configurations of the graphical interface.

In some examples, a customized communication interface overlay may be provided for display over a graphical interface of a website or a computer application. The customized communication interface overlay facilitates communication with a resource of a third-party, such as a customer service representative, a technical support representative, a sales representative, or other resources who are knowledgeable about a product or service. For example, a specifically customized file, or a customization file, may be transmitted to a computing device. The customization file may be executed by the computing device to customize a native communication interface overlay. In order to facilitate communication deflections, user interactions with the customized communication interface overlay may be detected along with a configuration state of the graphical interface when the interactions are made. Various details relating to examples of customized communication interface overlays and deflection of certain communications are described below with respect to the drawings.

These illustrative examples are given to introduce the general subject matter discussed herein, and are not intended to limit the scope of the disclosed concepts. The following sections describe various features and examples with reference to the drawings, in which descriptions are used to describe the illustrative examples but, like the illustrative examples, should not be used to limit the present disclosure.

FIG. 1 is a block diagram of an environment 100 according to one embodiment. The environment 100 includes a device 106. The device 106 may include a computing device, such as a mobile device, a desktop computer, a laptop computer, a tablet computer, a wearable electronic device, or any other suitable computing device. The device 106 may execute native application code to run a native application 128. In some embodiments, the native application 128 may include a mobile application 130. The mobile application code may be specifically written for the particular mobile application and may be specific to the platform or operating system of the device 106. The device 106 may execute mobile application code to run the mobile application 130 and display content of the native application 128.

The mobile application 130 may be received or downloaded from a mobile application store 104, and may be stored on the device 106. The mobile application 130 may be received or downloaded from the mobile application store 104 over connection 118. In some embodiments, the native application 128 may include one or more webpages, such as a webpage 112. The device 106 may include a web browser (e.g., Microsoft Explorer™, Firefox™, Google Chrome™, or other suitable web browser) that can execute a markup language file (e.g., a hyper-text markup language (HTML) file, or other type of markup language file) to run the webpage 112 and display content of the webpage 112. In some embodiments, the web browser may execute a client-side scripting language (e.g., Javascript or other suitable client-side scripting language) that allows the web browser to execute webpages and other client-side scripts. The webpage 112 may be received or downloaded from the web server 102 over connection 116. Connections 116 and 118 may be wired or wireless connections using a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), or a combination of a wired and a wireless network. While only one mobile application store 104 and one web server 102 are shown in FIG. 1, one of ordinary skill in the art will appreciate that more than one mobile application store or web server may provide applications or web content.

The native application 128 may include a graphical interface 126 that can be displayed on the device 106. In some embodiments, the graphical interface 126 may be displayed upon execution of a compiled set of code 134. For example, the compiled set of code 134 may be a set of program code that is separate from the native application code of the native application 128. One example of a compiled set of code includes a stand-alone library that can be accessed and used by other programs. The library code can be organized so that it can be used by different programs that have no connection to each other, whereas code that is part of a program is organized to be used within that one program. In such embodiments, the native application code may access the compiled set of code 134 to implement the graphical interface 126. For example, the compiled set of code 134 may be inserted or incorporated into the native application code. The native application 128 may launch and close the compiled set of code 134 as needed, and may send and receive commands to and from the compiled set of code 134. The compiled set of code 134 may provide further functionality, such as communication deflection analysis and reporting, as discussed further below. In some embodiments, the compiled set of code 134 may be provided or developed by a third-party service provider, and the native application 128 may be provided or developed by a client of the third-party service provider. For example, the third-party service provider may provide customer service, technical support, sales support, or other third-party services to the client. The compiled set of code 134 provided by the third-party service provider may provide the third-party services to the native application 128 of the client. The third-party service provider may maintain one or more servers, such as a third-party server 108. In some embodiments, the third-party server 108 provides the compiled set of code 134 to the device 106 over connection 120. Connection 120 may include a wired or wireless connection. In some embodiments, the compiled set of code is downloaded to the device 106 along with the native application 128 (e.g., from web server 102, mobile application store 104, or the like). In some embodiments, code for implementing the graphical interface 126 may be included in the native application code of the native application 128 itself instead of being separate from the native application code.

A communication interface overlay tab 124 may also be displayed with the graphical interface 126. The communication interface overlay tab 124 may be interactive and may run live along with the native application 128 and compiled set of code 134 on the device 106. In some embodiments, the communication interface overlay tab 124 may become visible to a user only after a specific user input is received through an input device of the device 106, such as a specific key combination on a keypad or keyboard of the device 106, a specific swiping movement or multi-touch input on a touchscreen or touchpad of the device 106, or other specific user input. A user may select the communication interface overlay tab 124 in order to display a communication interface overlay (not shown). For example, upon selection of the communication interface overlay tab 124 by a user, the communication interface overlay may be displayed. In some embodiments, the communication interface overlay tab 124 and the corresponding communication interface overlay can be presented as an actual overlay displayed over the graphical interface 126. In some embodiments, the communication interface overlay tab 124 and the corresponding communication interface overlay can be presented near or around the graphical interface 126 (e.g., the graphical interface 126 may be shrunk and displayed next to, above, or below the communication interface overlay or the tab 124).

In some embodiments, the native application 128 may present a user with an option to choose either a web version or a native application version of the native application 128. For example, the option may be displayed when the native application 128 is loaded. In another example, the option may be displayed in response to a selection of a settings option that allows a user to adjust settings of the native application 128. In the event a web version is selected, the native application 128 can select a version of the overlay element that is written in code executable from within a web browser. In the event a user selects the native application version, the native application 128 can select version of the overlay element written in native application code.

In an embodiment, the communication interface overlay facilitates communication with a resource of a third-party, such as the third-party service provider described above. For example, the communication interface overlay may facilitate communication between the third-party resource and a customer of the client of the third-party. In such an example, the third-party service provider may provide customer support (e.g., technical support, sales support, or other type of customer support) to customers of the client. To facilitate communication with the resource of the third-party, the communication interface overlay may include an interactive chat window through which the customer can communicate with the resource. The resource may communicate with the customer using the information resource receiver 110 over connection 122. Connection 122 may include a wired or wireless connection. The communication interface overlay may include one or more interface elements, such as text boxes, chat bubbles, or the like. The interface elements may display communications with the resource. The resource of the third-party may include a live human operating the information resource receiver 110. The live operator can be an individual provided by the company supplying the overlay element (e.g., the third-party service provider), can be an individual provided by the company running the website or mobile application (e.g., a client of the third-party service provider), or another company or individual. Upon initiating a proper command (e.g., clicking, tapping, or otherwise selecting the communication interface overlay tab 124), the device 106 can establish the connection 122 with the chat receiver 110. In some embodiments, the native application 128 can establish a chat connection 122 with a chat receiver 110 associated with the customer. In some embodiments, the native application 128 can establish a chat connection 122 with a chat receiver 110 associated with the third-party service provider.

In some embodiments, the communication interface overlay tab 124 and the corresponding communication interface overlay may be implemented and displayed upon execution of the compiled set of code 134 by the device 106. For example, the compiled set of code 134 may include an overlay file 114 that is used to implement the communication interface overlay tab 124. The overlay file 114 may control the functionality and appearance of the communication interface overlay tab 124 and the corresponding communication interface overlay that is running in the native application 128. The overlay file 114 may include a JavaScript Object Notation (JSON) file, an extensible markup language (XML) file, a YAML file, or any other appropriate type of data file. The overlay file 114 may include a default file that is provided with the compiled set of code 134 to all client applications that use the compiled set of code 134 to implement their graphical interface. The default file may provide a generic native communication interface overlay for display over a portion of or the entire graphical interface 126. In some embodiments, a customization file may be customized for a specific client of the third-party service provider. The customization file may include customized content for customizing the communication interface overlay to provide a customized communication interface overlay. For example, a client may customize their communication interface overlay by specifically choosing customized values for specific sections of the customization file corresponding to different features of the communication interface overlay. The customization file may include a JSON file, XML file, YAML file, or other appropriate type of data file. The third-party server 108 may transmit the customization file to the device 106. Upon receiving the customization file, the device 106 may access the default file that is included in the compiled set of code 134. The device 106 may determine whether the received customization file is different than the default file in order to decide whether to replace the default file with the customization file. In some embodiments, the device 106 may have previously received another customization file. In such embodiments, the device 106 may determine whether the most recently received customization file is different than the previously received customization file. In the event the device 106 determines that the customization file is different than the default file or previously received customization file, the device 106 may replace the default file or previously received customization file with the received customization file.

In some embodiments, the device 106 can establish the connection 120 with the third-party server 108. The third-party server 108 may support the operation of the communication interface overlay tab 124 and the corresponding communication interface overlay. In one example, the third-party server 108 may provide information indicating a particular chat receiver 110 to contact when the communication interface overlay is utilized by the user. For example, the third-party server 108 may keep records of available resources (e.g., including location, availability, expertise, language proficiency, and/or any other relevant information). The third-party server 108 may route the communication to a particular chat receiver 110 based on the records. In some examples, the third-party server 108 may send an address of the appropriate information resource receiver 110 for the native application 128 to contact. In some embodiments, the native application 128 can provide customer identification information (e.g., a number or a name particular to the customer) to the third-party server 108. The customer information may be used by the third-party server 108 to provide settings information to the device 106. The settings information may be used to determine which third-party resource to contact. For example, a client identification number stored on the device 106 can be transmitted to the third-party server 108. The third-party server 108 can return an address of the information resource receiver 110 to contact. The native application 128 can then cause the communication interface overlay to initiate a chat connection 122 with the chat receiver 110 based on the address provided by the third-party server 108.

It should be appreciated that the environment 100 may have other components than those depicted. Further, the embodiment shown in the figure is only one example of an environment that may incorporate an embodiment of the invention. In some other embodiments, the environment 100 may have more or fewer components than shown in the figure, may combine two or more components, or may have a different configuration or arrangement of components.

Figure 2:
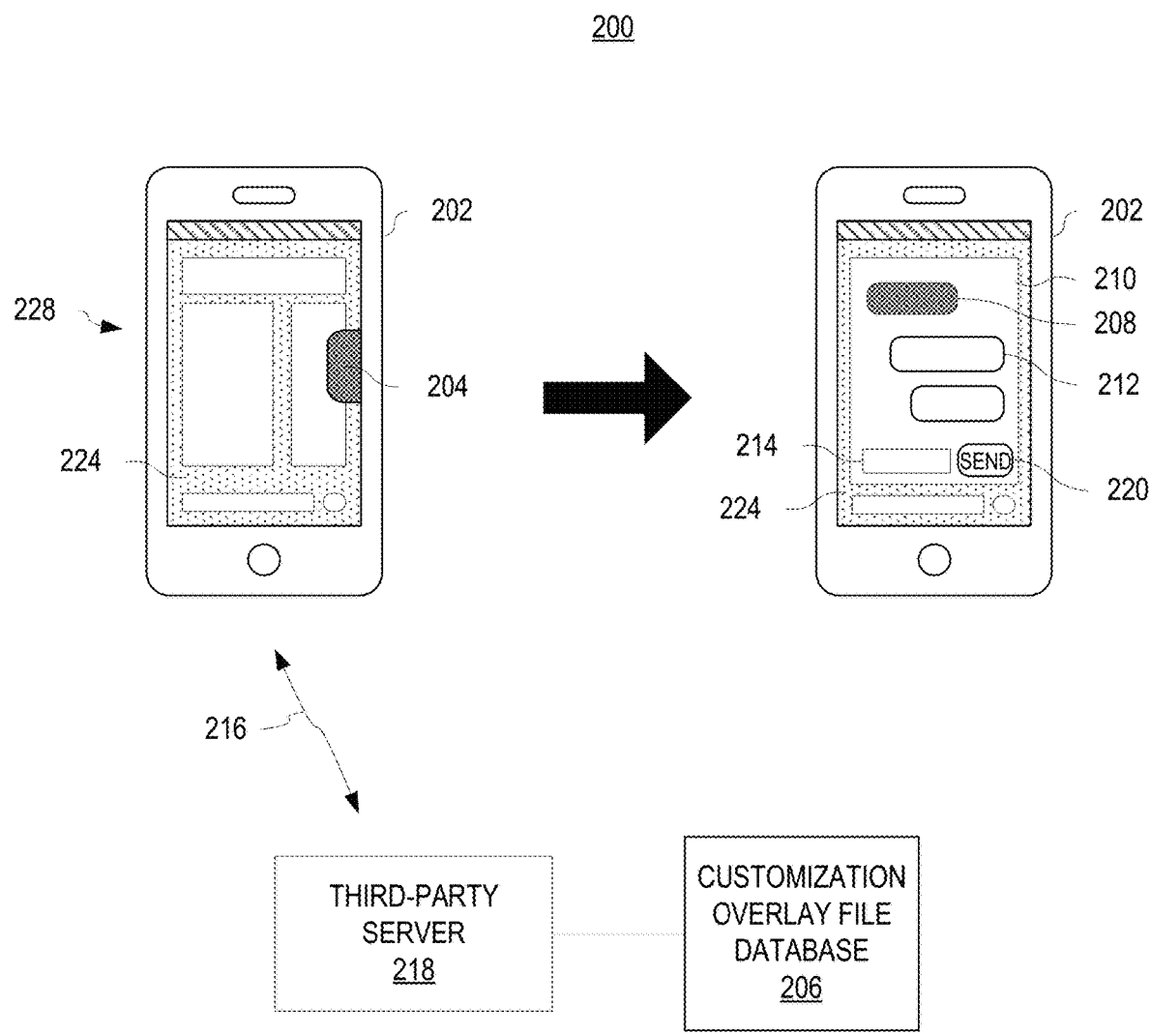
FIG. 2 is a block diagram of an environment including a device displaying a communication interface overlay according to one embodiment.

FIG. 2 is a block diagram illustrating an environment 200 including a device 202 that may receive and execute one or more customization files, according to one embodiment. The device 202 can use the customization file to customize a communication interface overlay operating on the device 202. The device 202 may be similar to the device 106 shown in FIG. 1, and may include a computing device. For example, the device 202 may include a mobile computing device, such as a mobile telephone or smartphone, a tablet computer, a laptop computer, or any other suitable computing device. As another example, the device 202 may include a desktop computer.

The device 202 may execute native application code to run a native application 228. The native application 228 may be similar to the native application 128 described above with respect to FIG. 1. For example, the native application 228 may include a mobile application or a webpage. The native application code for native application 228 may be provided to the device 202 by a mobile application server (not shown), by a web server (not shown), or other resource of computer applications.

The native application 228 may have access to a compiled set of code (not shown). Upon executing the compiled set of code using the native application 228, the device 202 can display the graphical interface 224. The compiled set of code may be similar to the compiled set of code 134 described with respect to FIG. 1. In some embodiments, the compiled set of code may be provided or developed by a third-party service provider, and the native application 228 may be provided or developed by a client of the third-party service provider. The third-party service provider may operate the third-party server 218. One of ordinary skill in the art will appreciate that the third-party service provider may operate multiple servers. In some embodiments, the third-party server 218 provides the compiled set of code to the device 202 over connection 216. In some embodiments, the compiled set of code is downloaded to the device 202 along with the native application 228 (e.g., from a mobile application server, web server, or the like).

A communication interface overlay tab 204 may be displayed along with the graphical interface 224. The communication interface overlay tab 204 may be similar to the communication interface overlay tab 124 displayed in FIG. 1. A user may select the communication interface overlay tab 204 in order to display a communication interface overlay 210, similar to that described above with respect to FIG. 1. The communication interface overlay 210 and the communication interface overlay tab 204 are shown in FIG. 2 as an actual overlay displayed over the graphical interface 224. In some embodiments, the communication interface overlay 210 and the communication interface overlay tab 204 can be presented near or around the graphical interface 224.

The communication interface overlay 210 facilitates communication with a resource of a third-party, such as the third-party service provider described above. For example, the communication interface overlay 210 may facilitate a chat communication between a live chat resource and a customer of a client of the third-party. The resource may send a message 208 to the native application 228. A user of the device 202 may enter a message into input box 214 and press a send button 220 to send a message to the resource. The resource may communicate with the customer using an information resource receiver, such as the information resource receiver 110 displayed in FIG. 1. The resource of the third-party may include a live human operating the information resource receiver.

The communication interface overlay tab 204 and the communication interface overlay 210 may be displayed and operated upon execution of the compiled set of code using the default application 228. The compiled set of code may include a default overlay file by default. The default overlay file is executed to implement the communication interface overlay tab 204 and communication interface overlay 210. The overlay file controls the functionality and appearance of the communication interface overlay tab 204 and the corresponding communication interface overlay 210. The overlay file may be similar to the overlay file 114 described with respect to FIG. 1, and may include a JSON file, an XML file, a YAML file, or any other appropriate type of data file. The default overlay file is provided with the compiled set of code to all client applications that use the compiled set of code to implement their graphical interface. The default file may provide a generic native communication interface overlay for display over a portion of or the entire graphical interface 224.

As described above with respect to FIG. 1, a customization file may be customized for a specific client of the third-party service provider. The third-party server 218 may maintain a customization overlay file database 206 that includes customization files for various clients of the third-party service provider. The different customization files in the customization overlay file database 206 may include customized content for customizing the clients' communication interface overlays to provide a customized communication interface overlay experience that is specific to each of the clients. The customization file may also include a JSON file, XML file, YAML file, or other appropriate type of data file. The third-party server 218 may be in communication with the native application 228 and/or the compiled set of code to determine whether the client who owns the native application 228 has a customization overlay file in the customization overlay file database 206. If the client has a customization overlay file, the third-party server 218 may retrieve the customization overlay file from the database 206, and may transmit the customization file to the device 202 over connection 216. The connection 216 may include wired or wireless connection. In some embodiments, the third-party server 218 may transmit the most recent customization file to the mobile application store and/or a web server that allow customers to download native applications that access the compiled set of code with the overlay file. In such embodiments, the device 202 may receive the customization overlay file from the mobile application store or from the web server.

Upon receiving the customization file, the device 202 (e.g., using the native application 228, the compiled set of code, a combination thereof, or another program) may retrieve the current overlay file that is included in the compiled set of code. The current overlay file may include the default overlay, or may include a previously received customization overlay file. The device 202 may determine whether the received customization file is different than the default file or a previously received customization file in order to decide whether to replace the default file or previously received customization file with the newly received customization file. The device 202 may then replace the default file or previously received customization file with the received customization file when it is determined that the newly received customization file is different.

Figure 3:
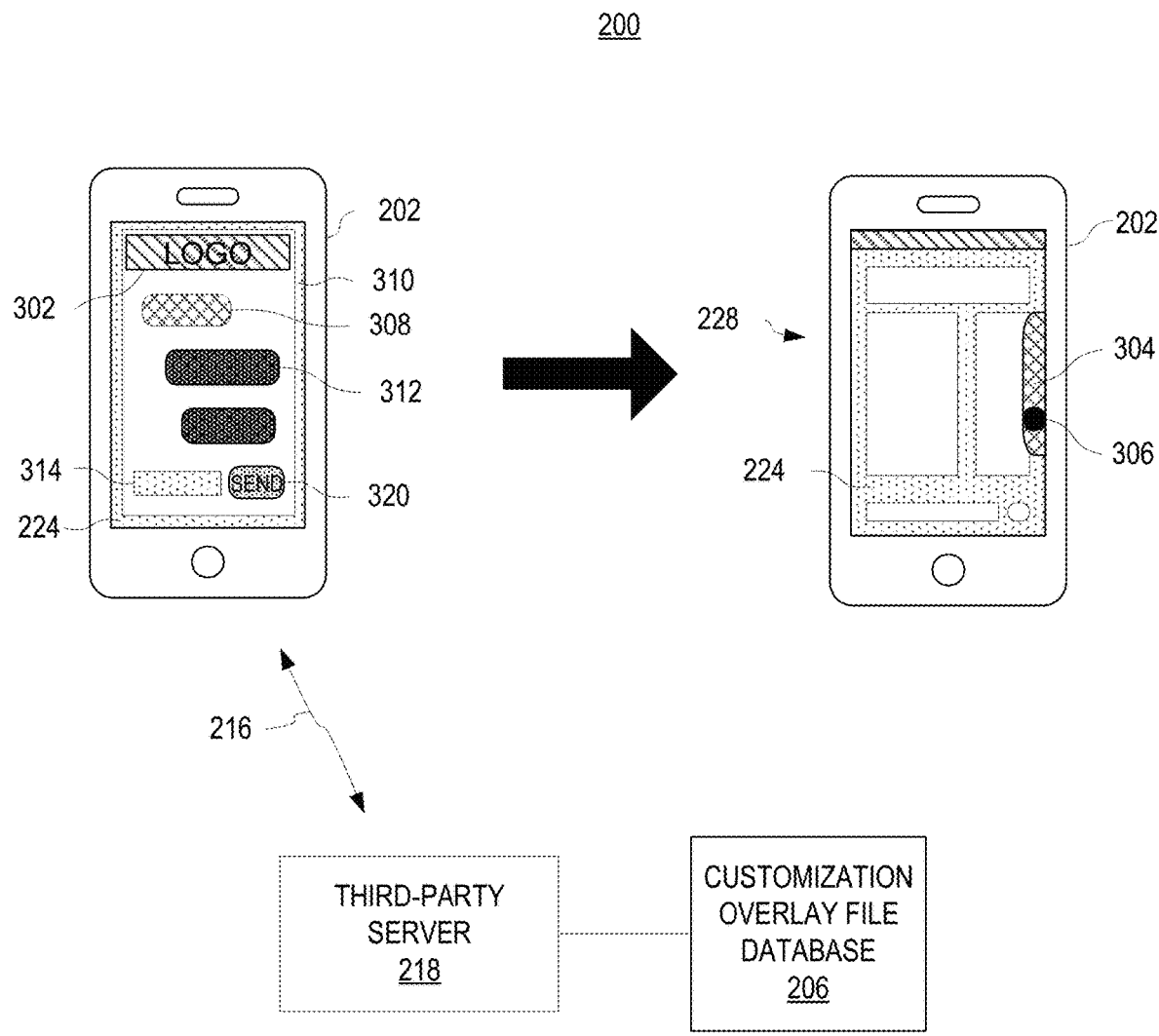
FIG. 3 is a block diagram of an environment including a device displaying a customized communication interface overlay according to one embodiment.

FIG. 3 illustrates the device 202 with a customized communication interface overlay 310. The customized communication interface overlay 310 may be displayed as the device 202 executes the customizable overlay file of the compiled set of code using the native application. In some examples, a client of the third-party service provider may customize the communication interface overlay 210 to create the customized communication interface overlay 310 by specifying parameters of the customizable overlay file. For example, the client may specifically choose customized parameter values for specific sections of the customization overlay file that correspond to different features and functions of the customized communication interface overlay 310. In one example, the client may select or otherwise indicate different values of a JSON or XML file that correspond to different features and functions of the customized communication interface overlay 310. For example, the client may designate the values so that the customized communication interface overlay 310 includes customized message boxes 308 and 312, a customized logo 302, a customized input box 314, and a customized send button 320. One of ordinary skill in the art will appreciate that other customized features and functions may be provided in the customized communication interface overlay 310. In some embodiments, the client may send the desired features and functions to the third-party service provider so that the service provider can create the customization overlay file. In some embodiments, the client can create the customization overlay file. Once the customization overlay file is created, it can be stored in the customization overlay file database 206. The third-party server 218 can then send the customization overlay file to the device 202 so that the native application 224 can implement the customized communication interface overlay 310. In some embodiments, the third-party server 218 may transmit the customization overlay file to a mobile application store or a web server that provide for download native applications that access the compiled set of code with the overlay file.

FIG. 3 further illustrates a customized communication interface overlay tab 304 that is customized according to the customization overlay file. The customized communication interface overlay tab 304 includes customization 306, which may include any customized feature chosen by the client, such as a logo, a message, an advertisement, or other customized feature.

It should be appreciated that the environment 200 may have other components than those depicted. Further, the embodiment shown in the figure is only one example of an environment that may incorporate an embodiment of the invention. In some other embodiments, the environment 200 may have more or fewer components than shown in the figure, may combine two or more components, or may have a different configuration or arrangement of components.

FIGS. 4-8 include examples of screenshot illustrations that may appear on a computing device, such as the devices 106 or 202. The screenshots in FIGS. 4-8 illustrate examples of settings that may be selected by a client of a third-party service provider to specify different features and functions of the communication interface overlay of the client's native application. For example, upon selecting one or more of the settings displayed in FIGS. 4-8, a server (e.g., third-party server 108 or 218) may update an overlay file to create a customization overlay file for the client, similar to that described above with respect to FIGS. 1-3. One of ordinary skill in the art will appreciate that the client may specify features and settings for their communication interface overlay using other techniques. For example, the client may create the customization overlay file by entering different values in the actual customization overlay file that correspond to different features and functions of the communication interface overlay. As another example, the client may send a description of desired features and functions to the third-party service provider so that the service provider can create the customization overlay file.

Figure 4:
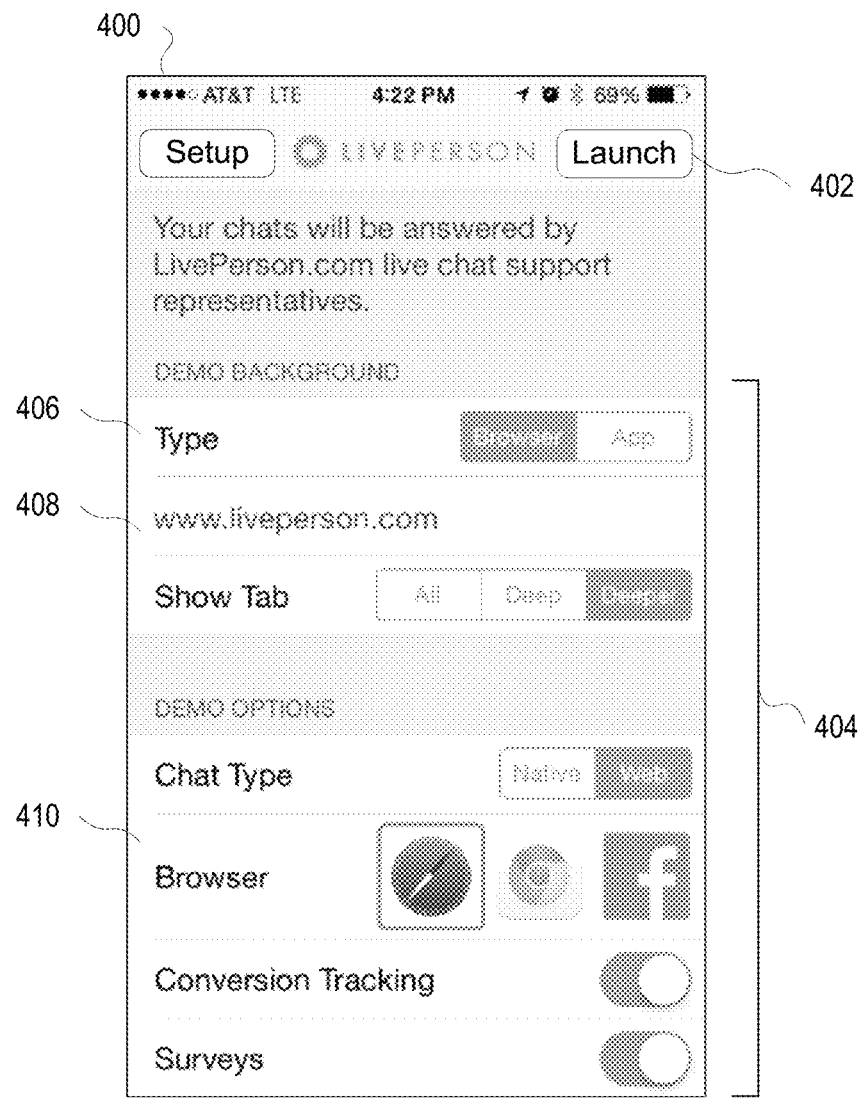
FIG. 4 is a depiction of a settings screen displayable on a computing device according to one embodiment.

FIG. 4 illustrates a settings screen 400 displayable on a computing device according to one embodiment. The settings screen 400 can contain various settings 404, which can correspond to optional settings that a client can select to customize their communication interface overlay to control how the customized communication interface overlay operates and appears. The settings screen 400 can include a type setting 406, allowing the client to specify whether the communication interface overlay settings being selected apply to a mobile application version or a web version. In some embodiments, changing the mode of implementation can also effect what settings are displayed on the settings screen 400. The settings screen 400 can include a URL entry box 408. The client can enter the URL of the web site to which the applied settings will apply. The settings screen 400 can also include a browser selector 410, allowing the client to select one or more browser types that can be used to display the customized communication interface overlay. Similarly, in the event the client selects the "App" type, the settings screen 400 may include a mobile application entry box (not shown) that allows the client to enter a name of the mobile application to which the applied settings will apply. In some embodiments, a separate window may appear that allows the client to search for the appropriate mobile application, such as a window corresponding to a mobile application store. One of ordinary skill in the art will appreciate that the settings screen 400 can include other settings. The settings screen 400 can include a launch button 402. When pressed or otherwise selected by the client, the launch button 402 can cause a computing device to send the settings to a server (e.g., third-party server 108 or 218) so that the server can create a customization overlay file. In some embodiments, upon selection of the launch button 402, the computing device may load a demonstration screen that may illustrate an example of the communication interface overlay with the selected settings implemented. In some embodiments, selection of the launch button 402 may cause a new settings screen to be displayed.

Figures 5, 6:
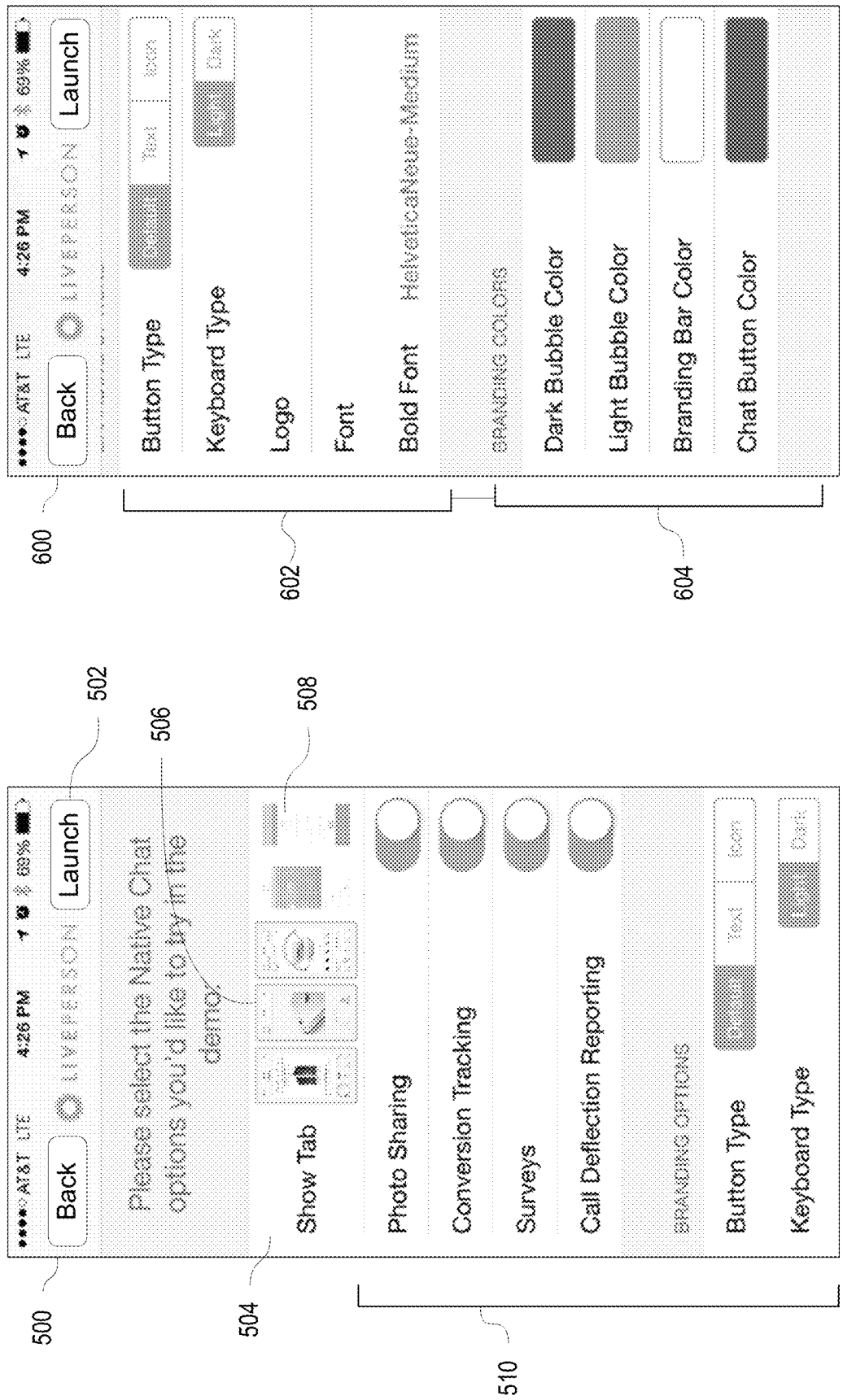
FIG. 5 is a depiction of a settings screen displayable on a computing device according to one embodiment.
FIG. 6 is a depiction of a settings screen displayable on a computing device according to one embodiment.

FIG. 5 illustrates another settings screen 500 displayable on the computing device according to one embodiment. The settings screen 500 may be displayed upon the launch button 402 being pressed on the settings screen 400. The application settings screen 500 can include a graphical representation selector 504. The client can select one or more options provided by the graphical representation selector 504 to indicate one or more graphical representations that are to be included in the customized communication interface overlay. For example, the options provided by the graphical representation selector 504 may include logos, images, videos, or the like that the client wants displayed in the customized communication interface overlay. As illustrated in FIG. 5, the graphical representation selector 504 shows three selected graphical representations 506 and two non-selected graphical representations 508. In some embodiments, the graphical representations available to be selected can be obtained from the client. For example, the client may upload the graphical representations. The application settings screen 500 can include various settings 510, which can control the appearance or functionality of the communication interface overlay or the overlay element. For example, the client can specify whether photo sharing, conversation tracking, surveys, or call deflection reporting is enabled. The application settings screen 500 can include a launch button 502, which when pressed or otherwise selected can cause the computing device to finish the input settings process.

FIG. 6 is a depiction of a settings screen 600 displayable on the computing device according to one embodiment. Settings screen 600 is an extension of settings screen 500 illustrated in FIG. 5, available by scrolling downwards. Additional settings can be presented, which can control the appearance or functionality of the communication interface overlay. For example, the client may select various branding options 602 such as button type, keyboard type, and font. The client may also upload or select a log to present in the communication interface overlay. In another example, the client may select colors in the branding colors section 604 for different features of the communication interface overlay.

Figure 7:
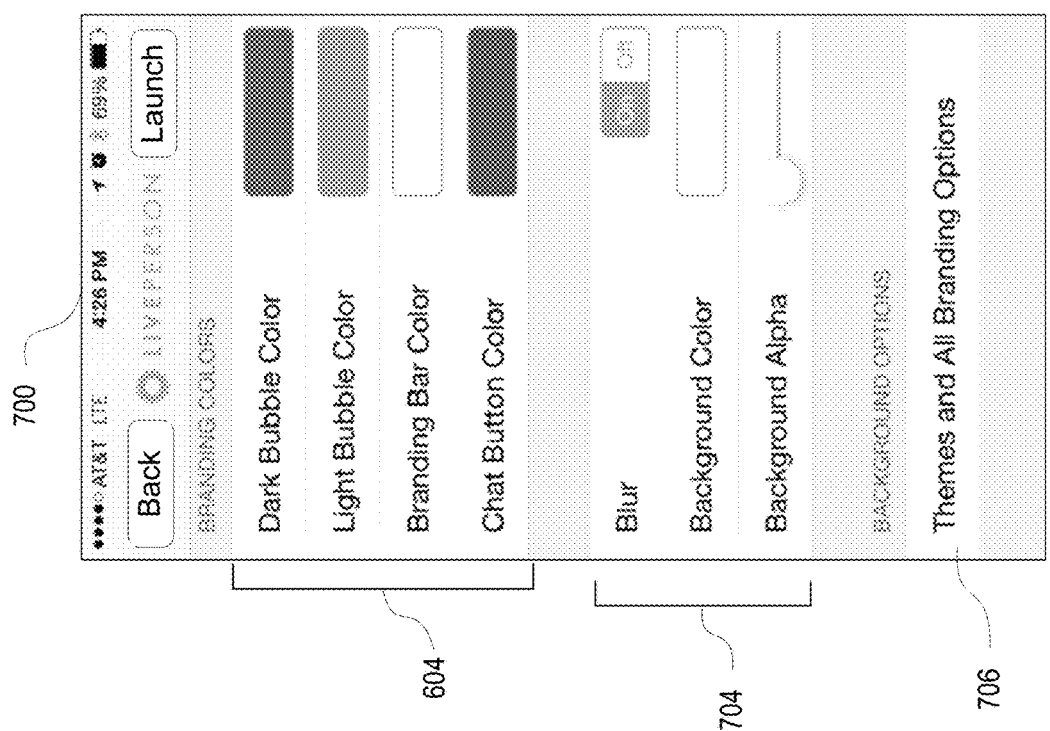
FIG. 7 is a depiction of a settings screen displayable on a computing device according to one embodiment.

FIG. 7 is a depiction of a settings screen 700 displayable on a computing device according to one embodiment. Settings screen 700 is an extension of settings screen 600 illustrated in FIG. 6, available by scrolling downwards. Settings screen 700 includes the branding colors section 604 illustrated in FIG. 6. The settings screen 700 includes additional branding color section 704. The options provided in the additional branding color section 704 can be selected to further control the appearance or functionality of the communication interface overlay. For example, the client can turn a blur option on or off, which may obscure the underlying native application, such as by blurring, fading, or overlaying a translucent color over the graphical interface of the underlying native application. The client may also determine a color of the obscured graphical interface and an amount of blurring, fading, or color to use for obscuring the graphical interface of the underlying native application. The settings screen 700 may further include a themes and branding options button 706. Selected of the themes and branding options button 706 may cause the computing device to load a branding screen 800 illustrated in FIG. 8.

Figure 8:
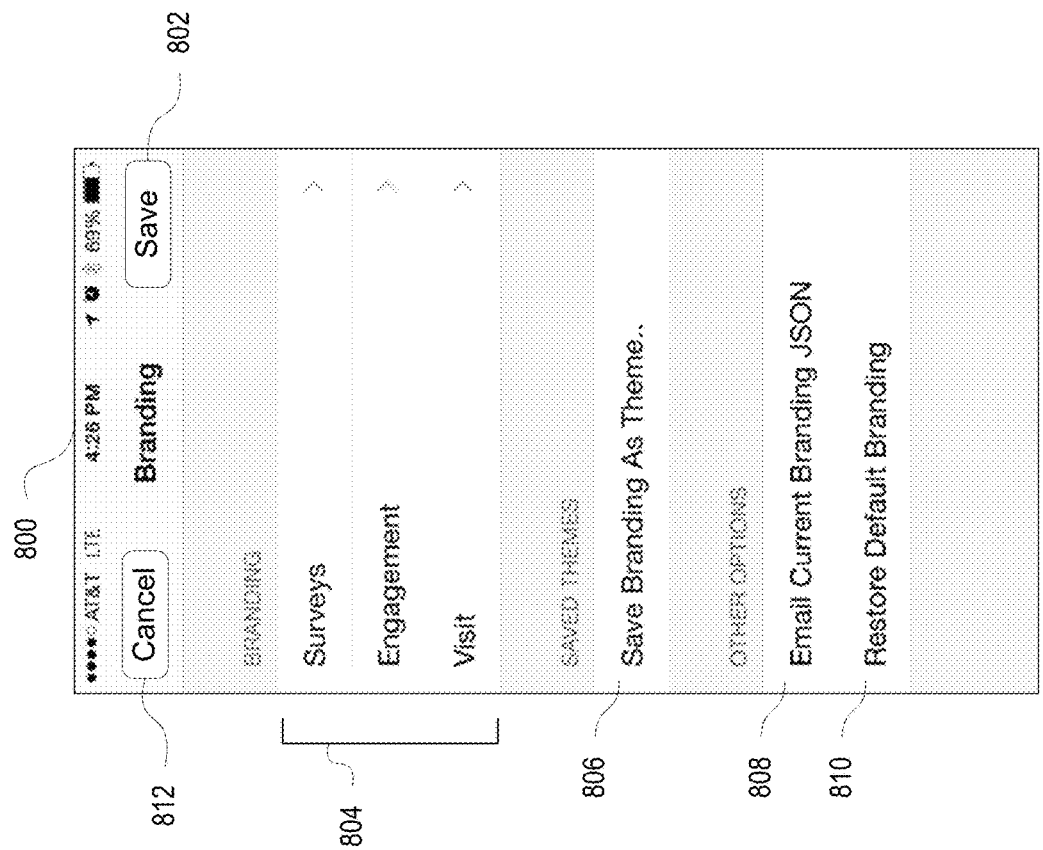
FIG. 8 is a depiction of a settings screen displayable on a computing device according to one embodiment.

FIG. 8 illustrates a branding screen 800 displayable on the computing device according to one embodiment. The branding screen 800 can contain buttons and menus that can be used to make branding customizations and make use of the customizations. The branding screen 800 can have branding menus 804, each of which can be used to control the appearance and functionality of different aspects of the overlay element. For example, a client can select the surveys option to further customize the appearance and functions of a survey that may be provided to a customer of the client. The branding screen 800 can include a save branding as theme button 806, which when pressed can cause the computing device to save the current theme settings, branding customizations, or both as a theme, which can be exported or recalled at a later time. The branding screen 800 can include an email button 808, which when pressed can cause the computing device to generate an email draft containing the settings, branding customizations, or both. The email draft can be generated in the form of a JSON file, an XML file, or any other appropriate data file. The email draft can be sent using any suitable email application on the computing device. The branding screen 800 can include a restore default branding button 810, which when pressed can cause the computing device to restore the settings, branding customizations, or both to default factory settings. The branding screen 800 can include a save button 802, which when selected can cause the computing device to save any changed branding customizations and return to the application settings screen 400 or 500. A cancel button 812 may also be displayed, which when selected can cause the screen to return to settings screen 400 or 500.

While FIGS. 4-8 include examples of a client of a third-party service provider specifying different features and functions of the communication interface overlay of the client's native application using an application interface, one of ordinary skill in the art will appreciate that the client may specify features and settings for their communication interface overlay using other techniques. For example, the client may create the customization overlay file by entering different values in the actual customization overlay file that correspond to different features and functions of the communication interface overlay. As another example, the client may send a description of desired features and functions to the third-party service provider so that the service provider can create the customization overlay file.

FIGS. 9-14 include examples of screenshot illustrations of a graphical interface of a native application displayed with a customized communication interface overlay tab and a customized communication interface overlay on a computing device, such as the devices 106 or 202.

FIG. 9 illustrates an example of a screen 900 displaying a graphical interface 902 of a native application on a computing device according to one embodiment. The screen 900 also displays a customized communication interface overlay tab 904. The graphical interface 902, native application, and customized communication interface overlay tab 904 may be similar to the graphical interface 224, native application 228, and customized communication interface overlay tab 304 discussed with respect to FIG. 2. The graphical interface 902 of the native application and/or the customized communication interface overlay tab 904 may be presented based on the selected graphical representations 506. A customer or user of the client may select the customized communication interface overlay tab 304, which may cause the computing device (e.g., using the native application and/or the compiled set of code) to open a customized communication interface overlay.

FIG. 10 illustrates the screen 900 displaying the graphical interface 902 and customized communication interface overlay tab 904 along with a function bar 1006 according to one embodiment. The function bar 1006 may be displayed when the native application and/or compiled set of code receives a specified input from a user. For example, a user may swipe a finger across the demonstration screen 900, which may include a touchscreen or other touch sensitive interface. Other specified inputs can be used, such as input from an accelerometer when the user shakes the computing device. Upon receiving the specified input, the function bar 1006 can appear. The function bar 1006 may include buttons for using or configuring the graphical interface or communication interface overlay. The function bar 1006 can include a chat button 1010, which when pressed can cause the computing device (e.g., using the native application and/or the compiled set of code) to open a customized communication interface overlay without the need for the user to press the customized communication interface overlay tab 904. In some embodiments, the function bar 1006 can include a purchase button 1012, which when pressed can cause the computing device to simulate a purchase made from within the native application. The function bar 1006 can also include a call button 1014, which can be used to place a telephone call from the native application, such as to a resource or representative of the third-party server provider supplying the compiled set of code and the customization overlay file. The function bar 1006 can include a settings button 1008, which when pressed can cause the computing device to load an application settings that allows the user to adjust certain graphical interface or communication interface settings.

FIG. 11 is a depiction of a screen 1100 displaying a pre-chat survey window 1102 displayable on a computing device according to one embodiment. In some embodiments, the pre-chat survey window 1102 may be displayed in response to the customer or user selecting the customized communication interface overlay tab 904 or the chat button 1010. The pre-chat survey window 1102 may be presented over a graphical interface 1108 of the native application. The graphical interface 1108 of the native application can be partially obscured, such as through blurring, fading, or overlaying a translucent color, according to the selection made by the client at screen 700 for example. The pre-chat survey window 1102 can include a cancel button 1104, which when pressed causes the computing device to dismiss the pre-chat survey window 1102. The pre-chat survey window 1102 can further include a next button 1106, which when pressed causes the computing device to present the survey to the user. For example, the graphical interface may load a name entry window 1200 as a first portion of the pre-chat survey.

FIG. 12 illustrates a screen 1200 displaying a name entry window 1202 of the pre-chat survey on a computing device according to one embodiment. The name entry window 1202 may be presented over the graphical interface 1108 of the native application. The name entry window 1202 can include a name entry box 1204. A customer or user of the client may enter (e.g., type, select from a list, or the like) a name for identification purposes during the chat communication session with the third-party resource. In some embodiments, a keyboard 1206 may be displayed for the purposes of entering characters into the name entry box 1204. The name entry window 1202 can include a done button 1206, which when selected can cause the computing device to load a communication interface overlay.

One of ordinary skill in the art will appreciate that, while only the name entry window 1202 portion of the pre-chat survey is shown, other survey questions may be presented to the user. For example, other pre-chat survey questions that may be presented to the user may include location, age, gender, or any other information that may assist the third-party resource in helping the user.

Figure 13:
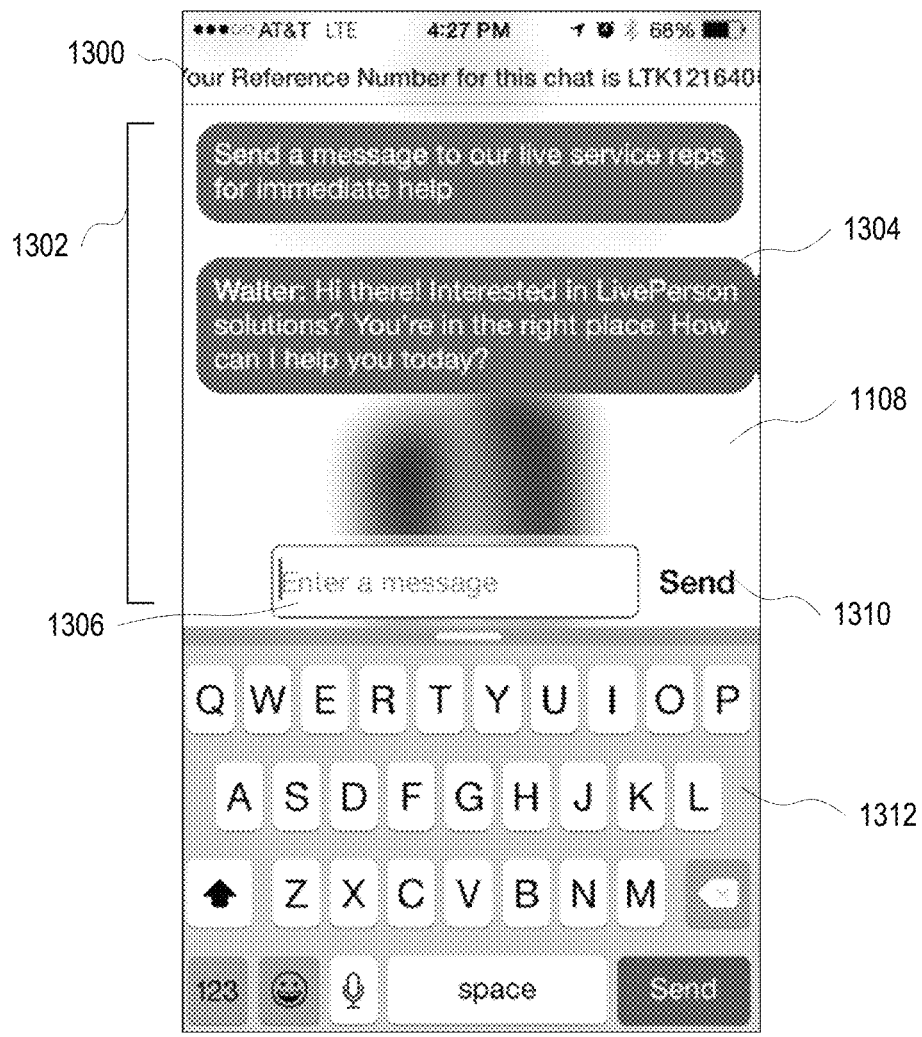
FIG. 13 is a depiction of a screen with a communication interface overlay displayable on a computing device according to one embodiment.

FIG. 13 is a depiction of a screen 1300 displaying a communication interface overlay 1302 displayable on a computing device according to one embodiment. Upon loading the communication interface overlay 1302, the computing device can either establish a new chat connection or continue an already existing chat connection. The communication interface overlay 1302 can enable a user to interact with a resource of the third-party service provider, such as an agent, through a live chat communication session. As illustrated, the communication interface overlay 1302 may be presented over the graphical interface 1108 of the native application. In some embodiments, the communication interface overlay 1302 may displayed next to or near the graphical interface 1108. The graphical interface 1108 of the native application can be obscured, as described above. The communication interface overlay 1302 can include a message bubble 1304 with information relating to the live chat, such as messages received by the computing device from the third-party resource, messages sent to the third-party resource from the computing device, or other information. The communication interface overlay 1302 can further include a message box 1306. A user or customer of the client may draft a message to be sent to the third-party resource, for example, by entering text, a photo, a video, or other information into the message box 1306. The communication interface overlay 1302 further includes a send button 1310, which when selected can cause the computing device to transmit any message typed into the message box 1306. A keyboard 1312 may be presented to allow a user to enter characters or text into the message box 1306. In some embodiments, the communication interface overlay 1302 may include a hide chat button (not shown), which when selected causes the native application or compiled set of code to dismiss the communication interface overlay 1302 without terminating the chat communication connection, thus allowing the user to resume the chat connection at a later time.

Figure 14:
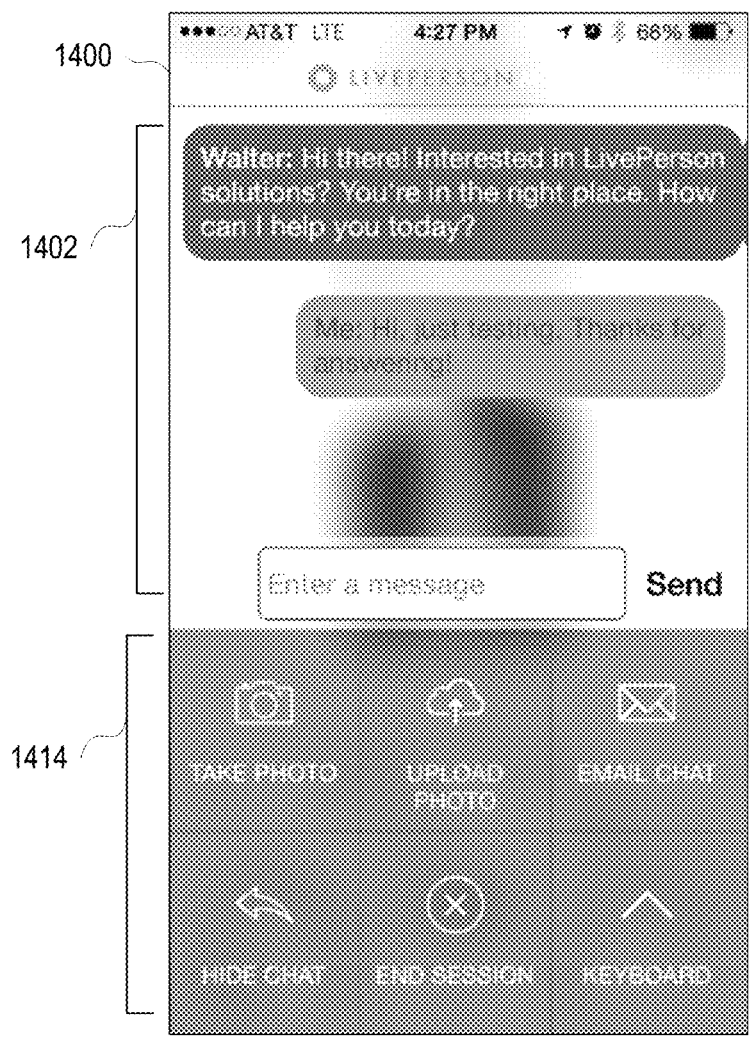
FIG. 14 is a depiction of a demonstration screen with a communication interface overlay and a function bar displayable on a computing device according to one embodiment.

FIG. 14 illustrates a screen 1400 displaying a communication interface overlay 1402 displayable on a computing device according to one embodiment. In addition to the various elements described above with reference to demonstration screen 1300, demonstration screen 1400 further includes a function panel 1414. The function panel 1414 can be opened or otherwise appear in response to a suitable input by a user. For example, a user may swipe up on a touchscreen of the computing device from the bottom of the touchscreen. The function panel 1414 can include several selectable options, each of which may cause the computing device to perform additional functions. One example of an additional function may include the ability to take a photo and include it in a message in the chat communication session. Another example of an additional function may include the ability to choose an existing photo stored on the computing device and include the existing photo in a message in the chat communication session. Other examples of additional functions may include the ability to generate an email transcript of the chat, the ability to hide the chat (e.g., dismiss the communication interface overlay 1402 without terminating the chat connection), the ability to end the session (e.g., dismiss the communication interface overlay 1402 and terminate the chat connection), and the ability to pull up the keyboard. The function panel 1414 may be hidden when the keyboard is displayed.

Figure 15:
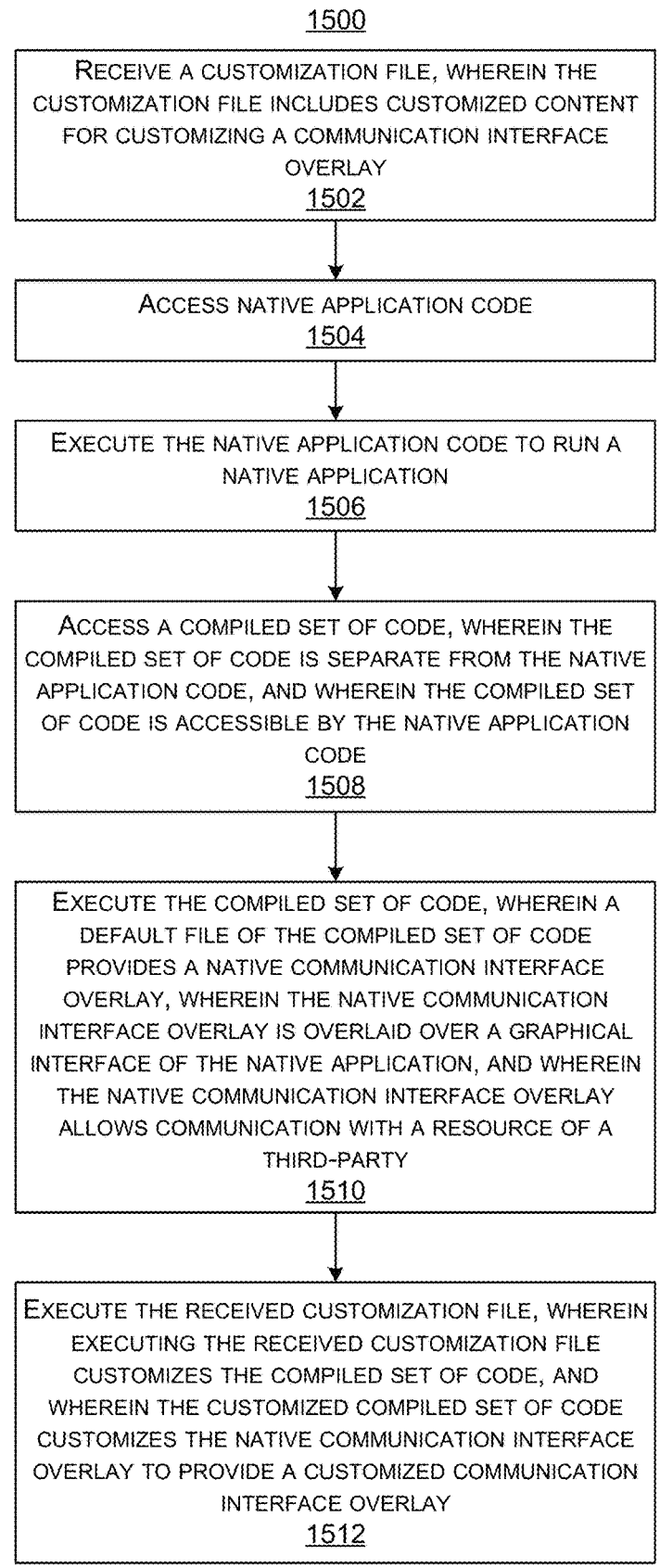
FIG. 15 is a flowchart illustrating an embodiment of a process of customizing a communication interface overlay.

FIG. 15 illustrates an embodiment of a process 1500 for customizing a communication interface overlay. In some aspects, the process 1500 may be performed by a computing device, such as computing device 106 or 202. The computing device may include a mobile device, a mobile telephone, a smartphone, a desktop computer, a laptop computer, a tablet computer, a wearable electronic device, or any other suitable computing device.

Process 1500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 1502, the process 1500 includes receiving, on a computing device, a customization file. The customization file includes customized content for customizing a communication interface overlay. In some examples, the customization file may include a JSON file, XML file, YAML file, or other appropriate type of data file. In some embodiments, the customization file may be received from a third-party server. For example, using FIG. 1 as an illustrative example, the third-party server 108 may transmit a customization file to the device 106.

At 1504, the process 1500 includes accessing native application code. At 1506, the process 1500 includes executing the native application code to run a native application. In some examples, the native application includes a mobile application (e.g., mobile application 130), and the native application code may be included as part of the mobile application. The native application code may be specifically written for the particular mobile application and may be specific to the platform or operating system of the computing device. In some examples, the native application may include one or more webpages (e.g., webpage 112), and the native application code may be included as part of the one or more webpages.

At 1508, the process 1500 includes accessing a compiled set of code, wherein the compiled set of code is separate from the native application code, and wherein the compiled set of code is accessible by the native application code. In one example, a compiled set of code may include a stand-alone library. For example, a stand-alone library can be accessed and used by other programs being executed by the computing device. The library code can be organized so that it can be used by different programs that have no connection to each other, whereas code that is part of a program is organized to be used within that one program. The native application code may access the compiled set of code to implement a graphical interface. For example, the compiled set of code may be inserted or incorporated into the native application code. The native application may launch and close the compiled set of code as needed, and may send and receive commands to and from the compiled set of code.

At 1510, the process 1500 includes executing the compiled set of code. The compiled set of code includes a default file. The default file of the compiled set of code, when executed, provides a native communication interface overlay that is overlaid over a graphical interface of the native application. The native communication interface overlay allows communication with a resource of a third-party. The resource of the third-party includes particular information about a subject. For example, the resource may include a technical support person, sales support person, an automated system, or other type of customer support resource. In some embodiments, the customized communication interface overlay includes an interactive chat window as illustrated, for example, in FIG. 13. As discussed with respect to FIG. 1, the communication interface overlay may facilitate communication between the third-party resource and a customer of a client of the third-party. In such an example, the third-party service provider may provide customer support resources (e.g., technical support person, sales support person, or other type of customer support resource) to customers of the client. The resource may communicate with the customer using an information resource receiver (e.g., information resource receiver 110).

At 1512, the process 1500 includes executing the received customization file, wherein executing the received customization file customizes the compiled set of code. The customized compiled set of code customizes the native communication interface overlay to provide a customized communication interface overlay.

In some embodiments, the process 1500 may include accessing the default file, wherein the default file is included in the compiled set of code, determining whether the received customization file is different than the default file, and replacing the default file with the received customization file when the received customization file is different than the default file. Using FIG. 1 as an illustrative example, the device 106, upon receiving the customization file, may access the default file that is included in the compiled set of code 134. The device 106 may determine whether the received customization file is different than the default file in order to decide whether to replace the default file with the customization file. In some embodiments, the device 106 may have previously received another customization file. In such embodiments, the device 106 may determine whether the most recently received customization file is different than the previously received customization file. In the event the device 106 determines that the customization file is different than the default file or previously received customization file, the device 106 may replace the default file or previously received customization file with the received customization file.

In some embodiments, the compiled set of code is accessed and executed and the customization file is executed when the native application code is provided by a particular client and the compiled set of code and the customization file are provided by the third-party. For example, the compiled set of code may be provided or developed by a third-party service provider, and the native application code may be provided or developed by a client of the third-party service provider. In some cases, the third-party service provider may provide customer service, technical support, sales support, or other third-party services to the client. The compiled set of code provided by the third-party service provider may provide the third-party services to the native application provided by the client. The third-party service provider may maintain one or more servers (e.g., third-party server 108) that provide the compiled set of code to the computing device. In such embodiments, the customized communication interface overlay facilitates communication between a customer of a particular client and the resource of the third-party.

As previously described, certain aspects and features of the present disclosure relate to deflecting certain types of communications. For example, the client of the third-party service provider may desire that more of their customers utilize a chat communication (e.g., using the communication interface overlay described above) rather than a telephone communication to receive help relating to the client's application or products. In some examples as described with respect to FIGS. 16-20, interactions with a graphical interface of a native application may be detected along with a configuration state of the graphical interface when the interactions are made. One or more metrics may be gathered and analyzed to determine communications traffic patterns that are attributable to different configurations of the graphical interface.

Figure 16:
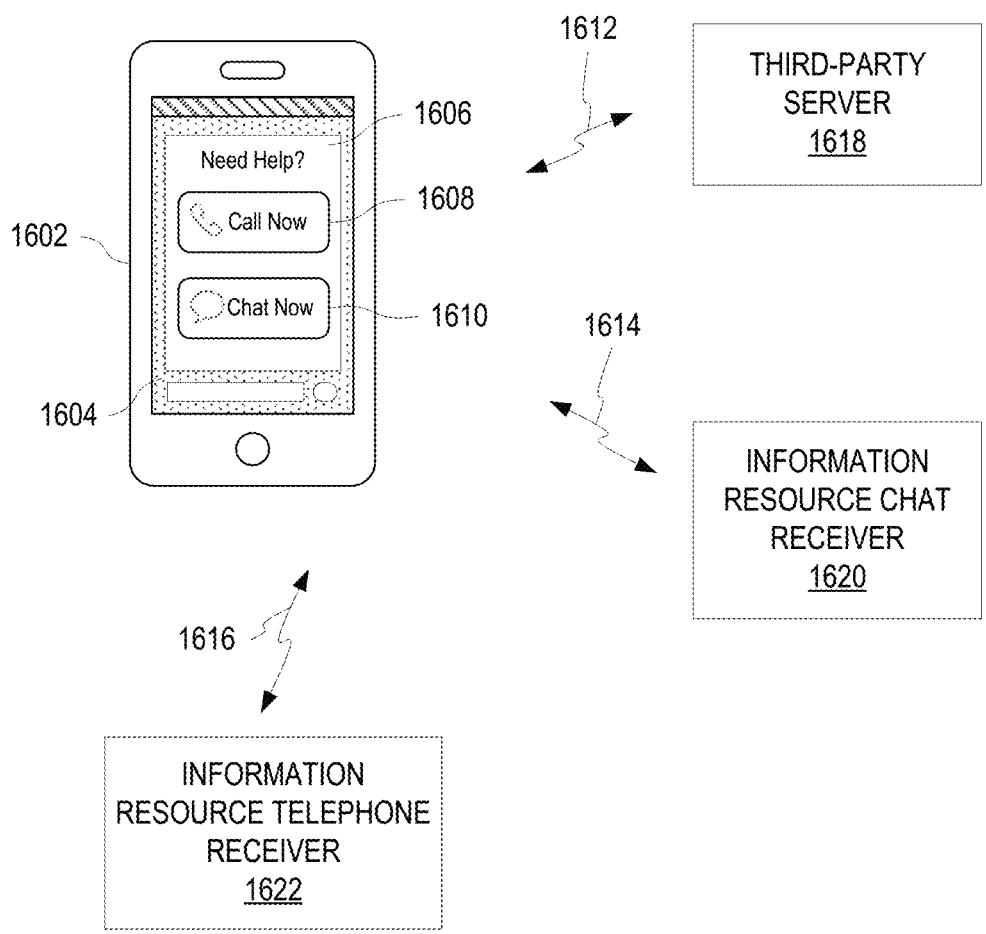
FIG. 16 is a block diagram of an environment including a device according to one embodiment.

FIG. 16 is a block diagram of an environment 1600 according to one embodiment. The environment 1600 includes a device 1602. The device 1602 may include a computing device, such as a mobile device, a desktop computer, a laptop computer, a tablet device, a wearable electronic device, or any other suitable computing device. The device 1602 may execute native application code to run a native application (not shown). In some embodiments, the native application may include a mobile application. The mobile application may be received or downloaded from a mobile application store, and may be stored on and executed by the device 1602. In some embodiments, the native application may include one or more webpages. The device 1602 may include a web browser (e.g., Microsoft Explorer™, Firefox™, Google Chrome™, or other suitable web browser) that can execute a hyper-text markup language (HTML) file to run the webpage and display content of the webpage. The webpage may be received or downloaded from a web server.

The native application may include a graphical interface 1604 that can be displayed on the device 1602. In one example, the graphical interface 1604 may be displayed upon execution of a compiled set of code (e.g., the compiled set of code 134). In another example, the graphical interface 1604 may be displayed upon execution of the native application code. The compiled set of code or the native application code may provide communication deflection analysis and reporting. In embodiments in which the communication deflection capabilities are included in the compiled set of code, the compiled set of code may be provided or developed by a third-party service provider, and the native application may be provided or developed by a client of the third-party service provider. The compiled set of code provided by the third-party service provider may provide the third-party services to the native application of the client. Regardless of whether the communication deflection capabilities are included in the compiled set of code or the native application code, the third-party service provider may provide customer service, technical support, sales support, or other third-party services to a client of the third-party service provider. The third-party service provider may maintain one or more servers, such as a third-party server 1618. The third-party server 1618 is in communication with the device 1602 using connection 1612. Connection 1612 may include a wired or wireless connection.

The native application may further include a help window 1606. The help window 1606 may be displayed as part of the graphical interface 1604. For example, the help window 1606 may include a new application window or page that pops up when selected, an overlay, or other displayed window. The help window 1606 may be displayed in response to a user selecting a help icon displayed on or with the graphical interface (e.g., a help icon displayed as part of the graphical interface, a help icon displayed as part of a communication interface overlay, or the like).

The help window 1606 includes a call now option 1608 and a chat now option 1610. The call now option 1608 includes a selectable phone communication link that a user may select to facilitate a telephone communication with a live resource. The live resource may conduct the telephone communication with the user over connection 1616 using the information resource telephone receiver 1622. The information resource telephone receiver 1622 may include a land-line or Internet Protocol telephone, a mobile phone, a smartphone, a desktop or laptop computer with voice connection capabilities, or the like. The chat now option 1610 includes a selectable chat link that a user may select to facilitate a chat communication with a live chat resource. The live resource and the live chat resource may include a person or computer that includes particular information about a subject corresponding to the native application. For example, the live resource may include a person that is knowledgeable about a particular product, a person that can provide technical support about the native application, or any other person with knowledge relating to products or services presented or provided by the native application. In some embodiments, a provider of the live chat resource is different from a provider of the native application. For example, the live chat resource may be an employee of the third-party service provider and the native application may be provided by the client of the third-party service provider. In some embodiments, the provider of the live chat resource is the same as the provider of the native application.

The live chat resource may conduct the chat communication with the user over connection 1614 using the information resource chat receiver 1620. The information resource chat receiver 1620 may include a desktop computer, a laptop computer, a tablet computer, a smartphone, or the like. Connections 1612, 1614, and 1616 may be wired or wireless connections using a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), or a combination of a wired and a wireless network.

Figure 17:
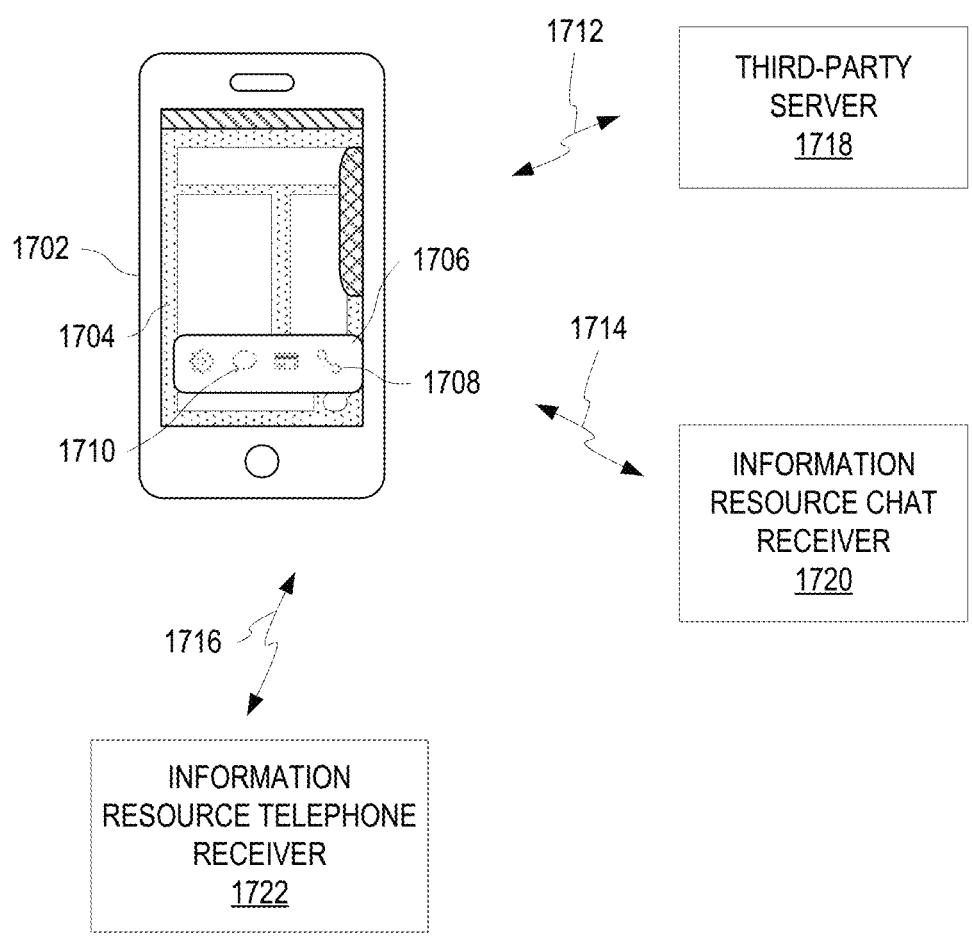
FIG. 17 is a block diagram of an environment including a device according to one embodiment.

FIG. 17 is a block diagram of an environment 1700 according to one embodiment. The environment 1700 includes a device 1702. The device 1702 may be similar to the device 1602. For example, the device 1702 may execute native application code to run a native application (not shown). A graphical interface 1704 may be displayed upon execution of the native application or a compiled set of code provided by third-party server 1718 over connection 1712. A help window 1706 may be displayed upon execution of the native application or the compiled set of code. Similar to the help window 1606 displayed in FIG. 6, the help window 1706 includes a call now option 1708 and a chat now option

1710. The call now option 1708 includes a selectable phone communication link that a user may select to facilitate a telephone communication with a live resource. The live resource may conduct the telephone communication with the user over connection 1716 using the information resource telephone receiver 1722. The information resource telephone receiver 1722 may include a land-line or Internet Protocol telephone, a mobile phone, a smartphone, a desktop or laptop computer with voice connection capabilities, or the like. The chat now option 1710 includes a selectable chat link that a user may select to facilitate a chat communication with a live chat resource. The live chat resource may conduct the chat communication with the user over connection 1714 using the information resource chat receiver 1720. The information resource chat receiver 1720 may include a desktop computer, a laptop computer, a tablet computer, a smartphone, or the like. Connections 1712, 1714, and 1716 may be wired or wireless connections using a wired network, wireless network, or a combination of a wired and a wireless network.

Figure 18:
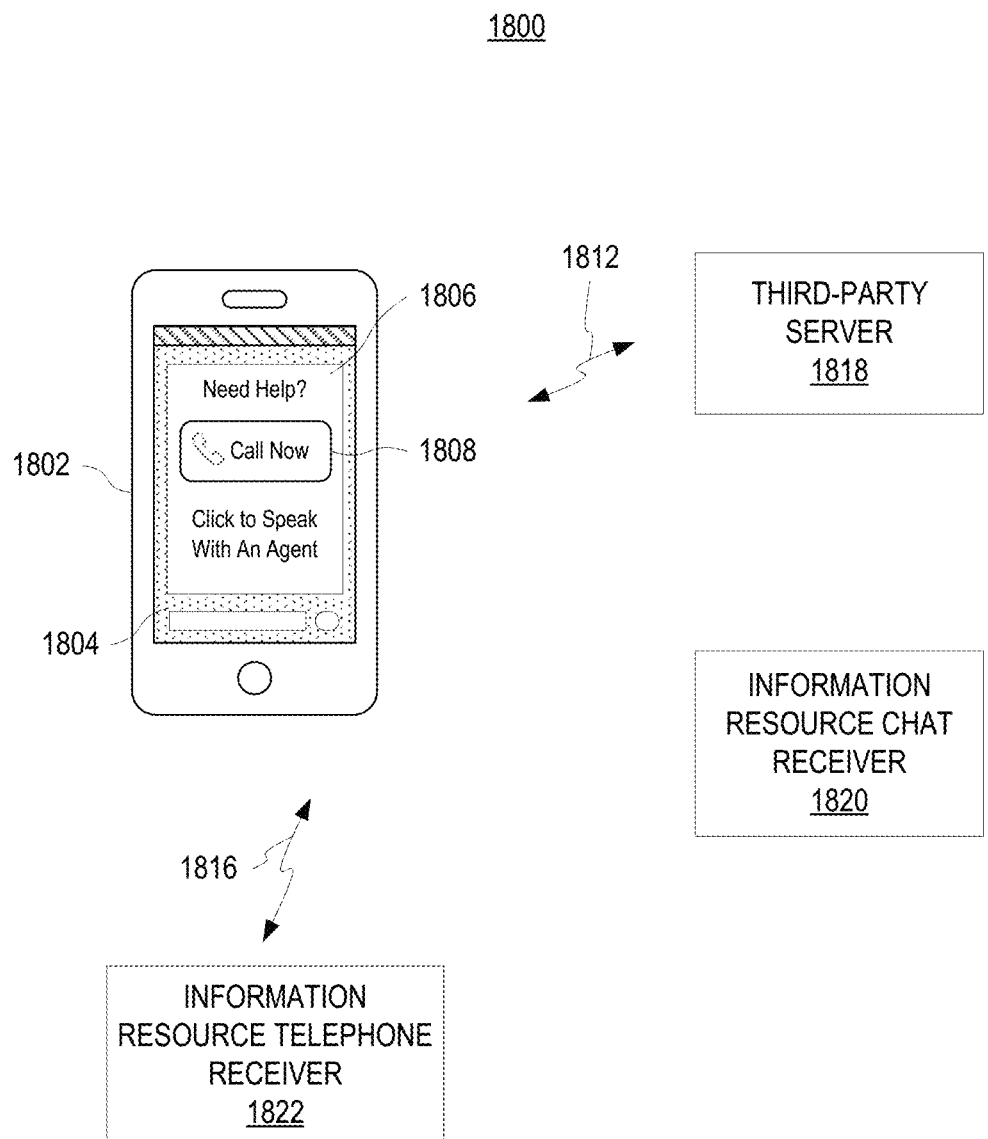
FIG. 18 is a block diagram of an environment including a device according to one embodiment.

FIG. 18 is a block diagram of an environment 1800 according to one embodiment. The environment 1800 includes a device 1802 that may be similar to devices 1602 and 1702. A native application may be displayed upon execution of native application code, and a graphical interface 1804 may be displayed upon execution of the native application code or a compiled set of code provided by third-party server 1818 over connection 1812. A help window 1806 may be displayed upon execution of the native application or the compiled set of code. The help window 1806 includes only a call now option 1808, and does not include a chat option. The call now option 1808 includes a selectable phone communication link that a user may select to facilitate a telephone communication with a live resource. The live resource may conduct the telephone communication with the user over connection 1816 using the information resource telephone receiver 1822.

Figure 19:
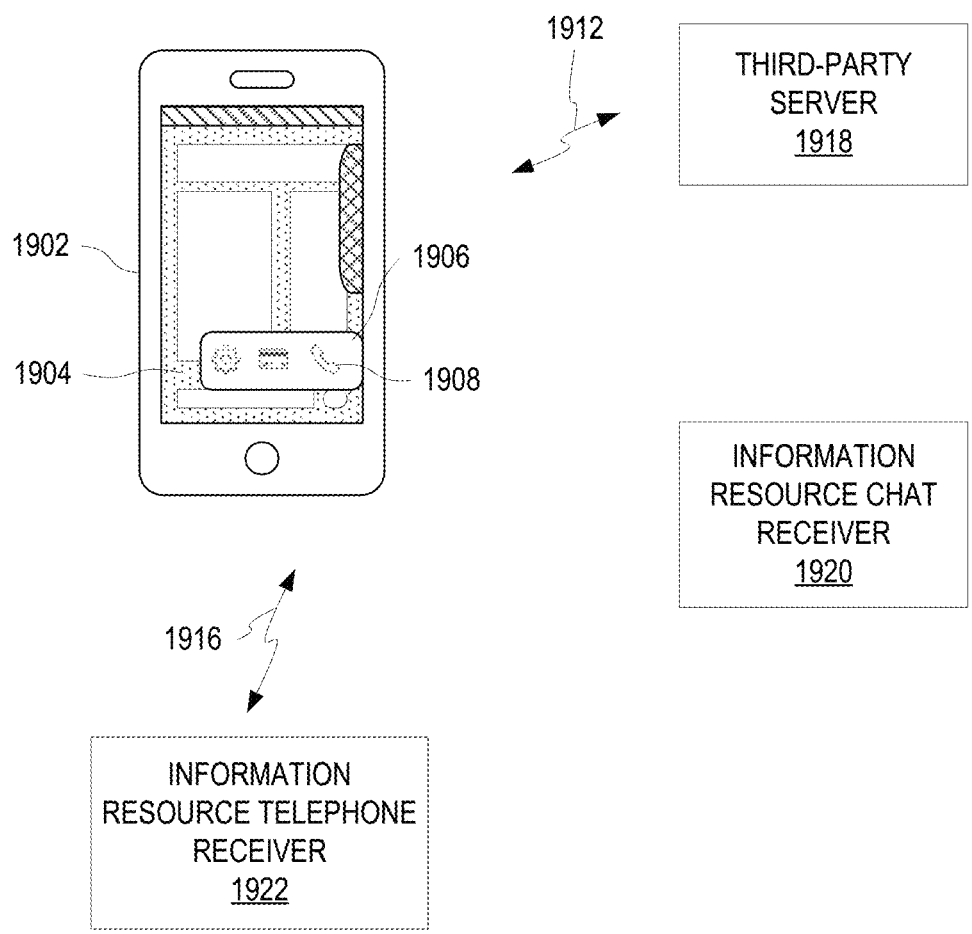
FIG. 19 is a block diagram of an environment including a device according to one embodiment.

FIG. 19 is a block diagram of an environment 1900 according to one embodiment. The environment 1900 includes a device 1902 that may be similar to devices 1602, 1702, and 1802. A native application may be displayed upon execution of native application code. A graphical interface 1904 may be displayed upon execution of the native application code or a compiled set of code provided by third-party server 1918 over connection 1912. A help window 1906 may be displayed upon execution of the native application or the compiled set of code. Similar to the help window 1806, the help window 1906 includes only a call now option 1908, but does not include a chat option. The call now option 1908 includes a selectable phone communication link that a user may select to facilitate a telephone communication with a live resource. The live resource may conduct the telephone communication with the user over connection 1916 using the information resource telephone receiver 1922.

While specific configurations of graphical interfaces are shown in FIGS. 16-19, one of ordinary skill in the art will appreciate that the graphical interfaces 1604, 1704, 1804, 1904 may be displayed with different configurations, such as with both a call now option and a chat now option, only a call now option, only a chat now option, or no communication options. In some embodiments, the different configurations may be a result of help services provided by a third-party service provider that provides services to a client, a client of the third-party service provider that provides the native application to its users or customers, or any other company providing help services. In some embodiments, the different configurations may result from a user's operation of the device. For example, a user may scroll to a particular part of a web page or application page that displays all or only a portion of help options. Using FIG. 18 as an example, a user may scroll to the top of an application page to the point that only the call now option 1808 is shown on the screen. Users may interact with the graphical interfaces 1606, 1706, 1806, 1906 differently depending on the configuration of the graphical interface. For example, a user may select a call now option if that is the only available option for obtaining help with a particular problem (e.g., technical support, sales support, general questions about a product or service, or the like). In another example, many users may select a chat now option in the event both a chat now option and a call now option are available for selection. In some instances, a client of a third-party service provider may want more of their customers to select a chat now option rather than a call now option. For example, the client may want fewer customers placing calls into the client's call center, and may prefer that the client utilize chat communications with the client's information resources or the third-party service provider's information resources. Accordingly, the devices 1602, 1702, 1802, 1902 and the third-party service provider may provide call deflection services by gathering and analyzing one or more metrics to determine communications traffic patterns that are attributable to different configurations of the graphical interfaces and help windows.

The devices 1602 and 1702, by executing the respective native application and/or the compiled set of code, may monitor user interactions with the help windows 1606, 1706, 1806, 1906 of the respective graphical interfaces, along with a configuration state of the help windows 1606, 1706, 1806, 1906 when the interactions are made. Using FIG. 16 as an example, a user may select a help icon (not shown) from the graphical interface 1604. In response to selection of the help icon, the help window 1606 may be displayed showing both the call now option 1608 and the chat now option 1610. The user may select the call now option 1608, which facilitates communication with a live resource of the third-party service provider using connection 1616. The device 1602 (e.g., using the native application or the compiled set of code) may receive input indicating that a telephone call has been placed from the native application. For example, a signal may be triggered upon selection of the call now option 1608. As another example, it may be determined that the call now option 1608 was used to place the telephone call based on the placement of the telephone call occurring from the native application. In this example, it may be determined that because the user was using the native application at the time of the call, the call was placed using the call now option 1608.

The device 1602 (e.g., using the native application or the compiled set of code) may then determine a state of a chat now option when the call now option 1608 is selected. For example, a state of the chat now option may include present in a graphical interface or not present in the graphical interface at the time at which the call now option 1610 is selected. Other states may also be included, such as present and active, present and not active, or the like. In some examples, a state may include a size, a color, a shape, or other feature of the chat now options. As illustrated in FIG. 16, the chat now option 1610 is displayed along with the call now option 1608. Accordingly, the device 1602 may determine that the state of the chat now option 1610 is present in the graphical interface 1604. The device 1602 (e.g., using the native application or the compiled set of code) may then report to the third-party server 1618 that the telephone call was placed using the call now option 1608, and that the state of the chat now option 1610 was present when the call now option 1608 was selected. Accordingly, the device 1602 may report to the third-party server 1618 that a call was placed by the user while within the native application and while the chat now option 1608 was available and displayed. In some embodiments, the device 1602 may also report a length of the call between the user and the live resource. The length of the call may be used to determine statistics relating to an amount of time live resources spend on the phone with customers.

In a different example, a user may select the chat now option 1610 instead of the call now option 1608. For example, the device 1602 may receive input indicating that the chat now option 1610 was selected to facilitate a chat communication from the native application. The device 1602 may determine that the chat now option 1610 was selected to place the chat communication in a similar manner in which selection of the call now option 1608 was detected, as previously described. The device 1602 may then report to the third-party server 1618 that the chat communication was placed using the chat now option 1610, and that a state of the call now option 1608 was present or active.

The devices 1602, 1702, 1802, 1902 may report other selections of interface options (e.g., call now option, chat now option, or any other appropriate option) and a configuration of the graphical interface as the options are selected. For example, upon receiving user selection of the call now option 1808, the device 1802 may report that a telephone communication was placed using the call now option 1808 and that a chat now option was not present or active when the call now option 1808 was selected.

As the information regarding option selections and graphical interface configurations are gathered by the devices 1602, 1702, 1802, 1902, the devices themselves or the third-party servers 1618, 1718, 1818, 1918 may determine call deflection analytics or statistics related to the selections and configurations. In some examples, devices or the third-party servers may determine a percentage of call deflections that result from the chat now option. For example, the percentage of call deflections may be determined by calculating a first percentage of selections of call now options when a chat now option is present and active, and calculating a second percentage of selections of the call now options when a chat now option is not present or not active. In one example, it may be determined that the chat now option is available 50% of the time when a user is in the native application. It may also be determined that when the chat now option is shown, 40% of the people click the call now option, and when the chat now option is not shown, 80% of the people click the call now option. Based on these determinations, the devices or third-party servers may determine that half of the telephone calls are being deflected by showing the chat now option. As a result, half as many calls are placed to the client's call centers by including a chat now option in their graphical interface.

In some embodiments, the call deflection analytics determinations may be made by the devices 1602, 1702, 1802, 1902 themselves. The devices 1602, 1702, 1802, 1902 may then transmit the analytics to the respective third-party servers. In some embodiments, the third-party servers 1618, 1718, 1818, 1918 may receive the option selections and graphical interface configurations (e.g., chat option state information), and may determine the call deflection analytics based on the information.

The devices 1602, 1702, 1802, 1902, using the native application and/or the compiled set of code, may report further information to the respective third-party servers that may be used to provide information to the client. For example, a number of visits to the native application may be reported. In another example, a number of hot leads may be reported, which include users that should be shown a chat or other button if there are agents available. A user may be determined to be a hot lead based on various factors, such as users that sign up for particular products or services, users that frequently use a chat help option, users that buy a certain amount of products or services, or any other suitable factors. In another example, a number of users that are shown a button, or button shows, may be reported. In another example, a number of users who selected a button to open up the graphical interface of the native application may be reported. In another example, a number of users who send a chat message and/or receive a chat message may be reported.

The third-party service provider may then provide the call deflection analytics and information to the client. Based on the call deflection analytics and information, the client can determine that certain configurations and layouts of the graphical interface are more valuable than others. For example, the client may decide that it is worth paying for a chat service provided by the third-party service provider in order lower the amount of calls made to the client's call centers. In another example, the client may determine that a chat now option should be placed in more locations in the graphical interface, such as any location at which there is a phone number or a call now option displayed in the graphical interface. In another example, the client may determine that a chat now option should be displayed larger or in a different color than is currently used. In another example, the client may determine that more live agents need to be added. One of ordinary skill in the art will appreciate that the call deflection analytics may be used for other suitable purposes.

The call deflection information gathering and analytics determinations may be performed automatically without any user interaction. For example, the compiled set of code may be installed on the devices 1602, 1702, 1802, 1902, and may be accessed by the native application to collect and report the option selections and graphical interface configurations, and to optionally determine the call deflection analytics.

FIG. 20 illustrates an embodiment of a process 2000 for customizing a communication interface overlay. In some aspects, the process 2000 may be performed by a computing device, such as computing device 1602, 1702, 1802, or 1902. The computing device may include a mobile device, a mobile telephone, a smartphone, a tablet computer, a wearable electronic device, or any other suitable computing device.

Process 2000 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 2002, the process 2000 includes displaying, using a computing device, a graphical interface corresponding to a mobile application. The graphical interface includes a selectable phone communication link or a selectable chat link. Selection of the selectable phone communication link facilitates a telephone communication with a live resource, and selection of the selectable chat link facilitates a chat communication with a live chat resource. The live chat resource includes particular information about a subject corresponding to the mobile application. In some embodiments, a provider of the live chat resource and/or the live resource is different from a provider of the mobile application. For example, the live chat resource or the live resource may be an employee of a third-party service provider, and the mobile application may be provided by a client of the third-party service provider. In some embodiments, the provider of the live chat resource and/or the live resource is the same as the provider of the native application. Using FIG. 16 as an illustrative example, the graphical interface includes graphical interface 1604 with help window 1606, the selectable phone communication link includes call now option 1608, and the selectable chat link includes chat now option 1610. One of ordinary skill in the art will appreciate that the graphical interface may include other configurations, including those illustrated in FIGS. 17-19 or other configurations.

At 2004, the process 2000 includes receiving input corresponding to an indication of placement of a telephone call from the application, wherein the selectable phone communication link is used to place the telephone call. Using FIG. 16 again as an example, the device 1602 may receive input corresponding to selection of the call now option 1608 (e.g., from a user of the device 1602). Selection of the call now option 1608 facilitates communication between the device 1602 and a live resource of the third-party service provider. The device 1602 may receive input indicating that a telephone call has been placed from the native application. In one example, a signal may be triggered upon selection of the call now option 1608. In another example, it may be determined that the call now option 1608 was used to place the telephone call based on the placement of the telephone call occurring from the native application. In this example, it may be determined that because the user was using the native application at the time of the call, the call was placed using the call now option 1608.

At 2006, the process 2000 includes determining a state of the selectable chat link when the selectable phone communication link was used to place the telephone call from the mobile application. In some embodiments, the state of the selectable chat link includes being present in the graphical interface or not being present in the graphical interface at the time at which the selectable phone communication link is selected. Other states may also be included, such as present and active, present and not active, a size, a color, a shape, a combination thereof, or any other suitable state or feature of the selectable chat link. Again using FIG. 16 as an illustrative example, the chat now option 1610 is displayed along with the call now option 1608 when the call now option 1608 is selected. The device 1602 (e.g., using the mobile application, other program, or the like) may determine that the state of the chat now option 1610 is present or present and active in the graphical interface 1604.

At 2008, the process 2000 includes reporting a communication, wherein the communication includes data indicating placement of the telephone call and the state of the selectable chat link when the selectable phone communication link was selected. Using FIG. 16 as an illustrative example, the device 1602 (e.g., using the mobile application, other program, or the like) may report to the third-party server 1618 that the telephone call was placed using the call now option 1608, and that the state of the chat now option 1610 was present or present and active when the call now option 1608 was selected. The communication indicates that a call was placed while within the mobile application and while the selectable chat option was present in the graphical interface.

In some embodiments, the process 2000 may include reporting a length of the telephone call with the live resource. For example, the length of the call may be used to determine statistics relating to an amount of time live resources spend on the phone with customers.

In some embodiments, the process 2000 may include receiving input corresponding to an indication of placement of a chat communication from the application, determining that the selectable chat link was selected to place the chat communication, and reporting a second communication, wherein the second communication includes data indicating placement of the chat communication. Referring to FIG. 16 as an illustrative example, the device 1602 may receive input corresponding to selection of the chat now option 1610 instead of the call now option 1608. For example, the device 1602 may receive input indicating that the chat now option 1610 was selected to facilitate a chat communication from the native application. The device 1602 may determine that the chat now option 1610 was selected to place the chat communication in a similar manner in which selection of the call now option 1608 was detected, as previously described. The device 1602 may then report to the third-party server 1618 that the chat communication was placed using the chat now option 1610, and that a state of the call now option 1608 was present and/or active.

In some embodiments, the process 2000 may include determining a percentage of call deflections as a result of the selectable chat link. The percentage of call deflections is determined based on a first percentage of selections of selectable phone communication links when the selectable chat link is in a first state, and a second percentage of selections of the selectable phone communication links when the selectable chat link is in a second state. For example, the percentage of call deflections may be determined by calculating a first percentage of selections of selectable phone communication links when a selectable chat link is present and/or active, and calculating a second percentage of selections of the selectable phone communication links when a selectable chat link is not present or is not active. In one illustrative example, it may be determined that the selectable chat link is available 50% of the time when the mobile application is being executed by the computing device. It may also be determined that when the selectable chat link is shown, 40% of people click a selectable phone communication link, and when the selectable chat link is not shown, 80% of people click a selectable phone communication link. Using these statistics, it may be determined that half of the telephone calls are deflected by showing a selectable chat link option.

Figure 21:
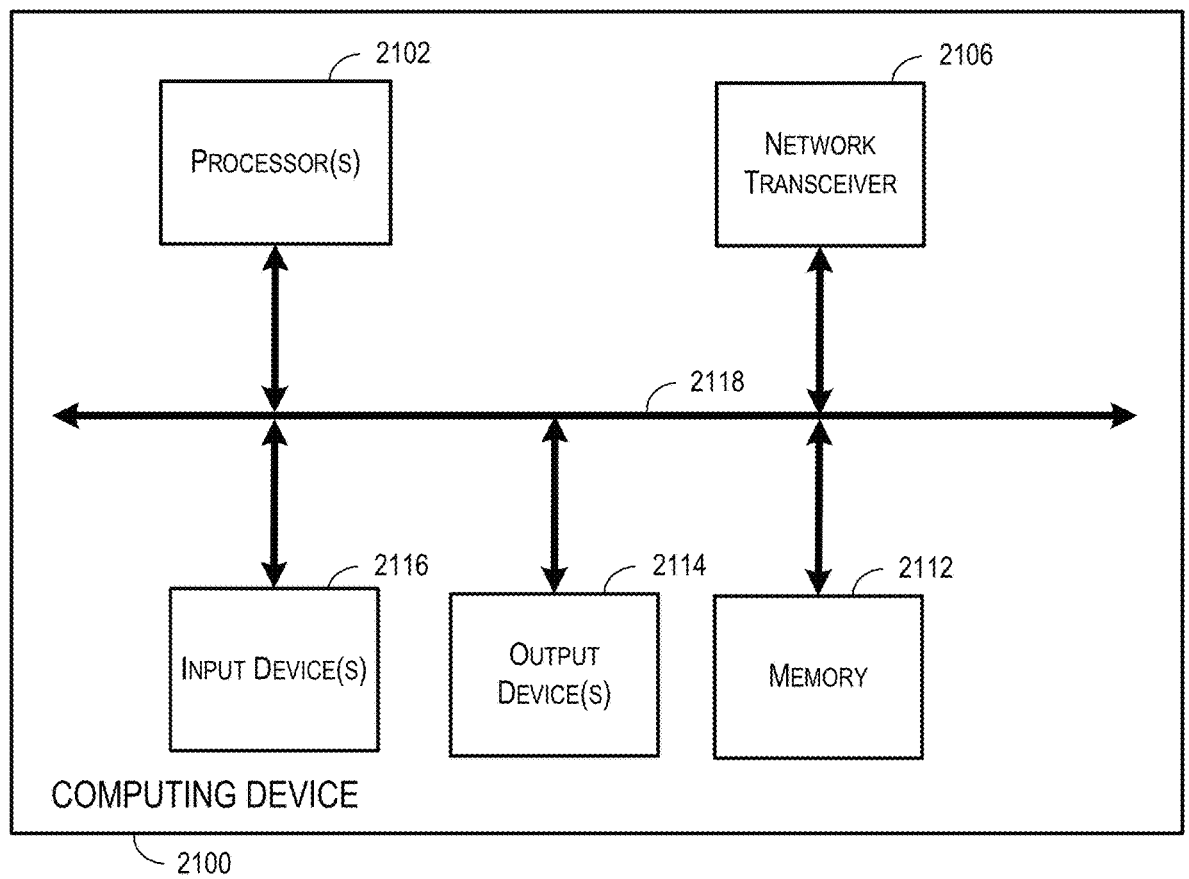
FIG. 21 illustrates an example of a computing device according to one embodiment.

FIG. 21 illustrates an example of a computing device 2100 (e.g., computing device) according to one embodiment. The computing device 2100 may include any human-to-machine interface with network connection. The computing device 2100 can have capability that allows accessing of a webpage. For example, the computing device 2100 may include a cellular telephone, a smartphone, a desktop computer, a laptop computer, a tablet, a personal digital assistant (PDA), or any other suitable device. The computing device 2100 can include hardware elements that can be electrically coupled using a bus 2118 (or may otherwise be in communication, as appropriate). In one embodiment, the bus 2118 can be used for the processor(s) 2102 to communicate between cores and/or with the memory 2112. The hardware elements may include one or more processors 2102, including without limitation one or more general-purpose processors and/or one or more special-purpose processors (such as digital signal processing chips, graphics acceleration processors, and/or the like); one or more input devices 2116, which can include without limitation a camera, a mouse, a keyboard, a touch sensitive screen, a touch pad, a keypad, and/or the like; and one or more output devices 2114, which can include, without limitation, a display, a printer, and/or the like.

The computing device 2100 may include one or more network transceivers 2106 connected to the bus 2118. The network transceiver 2106 may be operable to send and/or receive signals across a network connection, such as to and/or from a cloud or the Internet.

The computing device 2100 may further include (and/or be in communication with) one or more non-transitory machine-readable storage mediums or storage devices (e.g., memory 2112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2112, such as RAM, ROM, FLASH, or disc drive, and executed by processor(s) 2102. The computing device 2100 can also comprise software elements (e.g., located within the memory 2112), including, for example, an operating system, device drivers, executable libraries, and/or other code, such as one or more application programs, which may comprise computer programs implementing various functions. Such functions or code may include code to perform the steps described above with respect to FIGS. 1-4 and FIGS. 7-8. Memory 2112 may be a non-transitory machine-readable storage medium, processor-readable memory, and/or a computer-readable memory that stores the one or more computer-program products configured to cause the processor(s) 2102 to perform the various functions. In other embodiments, the various functions described may be performed in hardware.

Figure 22:
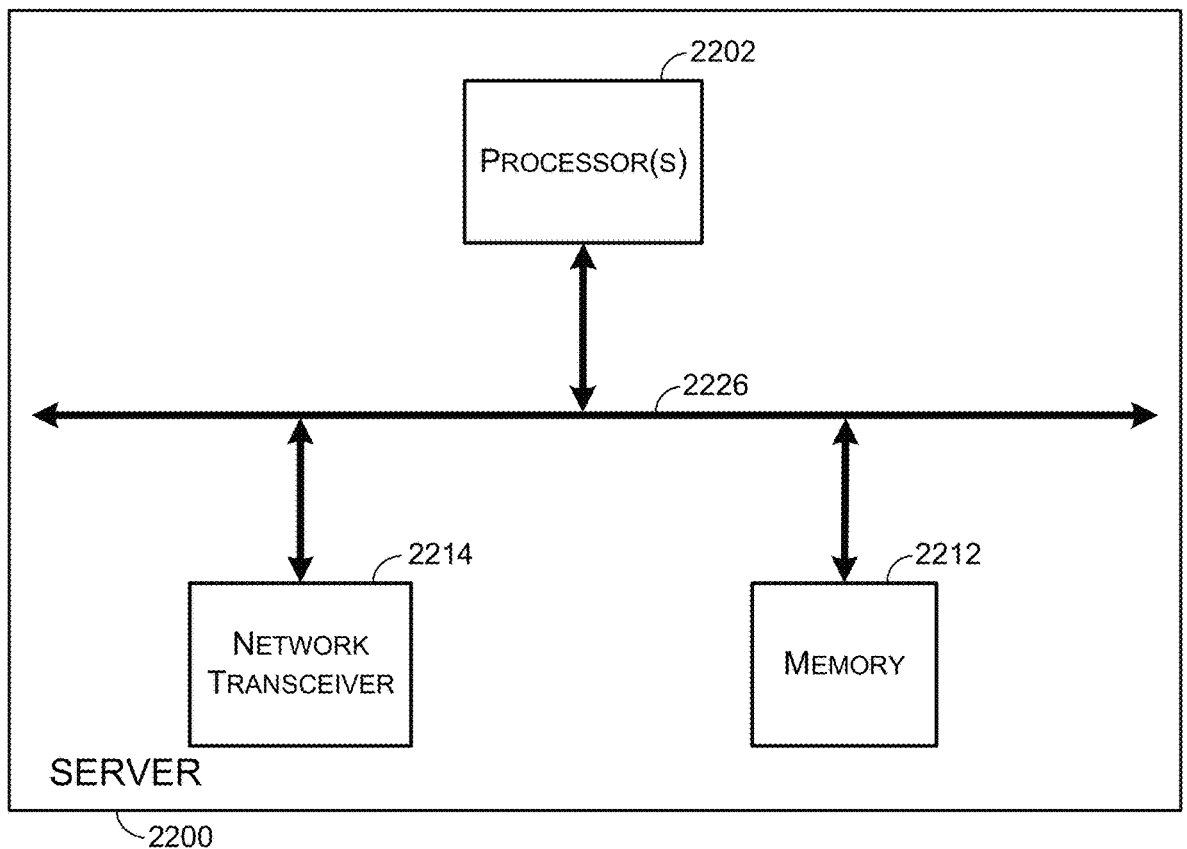
FIG. 22 illustrates an example of a server, such as a web server or a code server, according to one embodiment.

FIG. 22 illustrates an example of a server 2200, such as a web server or an app server, according to one embodiment. An application store can also be a server 2200. The server 2200 can include hardware elements that can be electrically coupled using a bus 2216 (or may otherwise be in communication, as appropriate). In one embodiment, the bus 2216 can be used for the processor(s) 2202 to communicate between cores and/or with the memory 2212. The hardware elements may include one or more processors 2202, including without limitation one or more general-purpose processors and/or one or more special-purpose processors (such as digital signal processing chips, graphics acceleration processors, and/or the like), memory 2212, a bus 2216, and a network transceiver 2214. The network interface 2214 can enable communication with a network (e.g., a cloud or the Internet).

The server 2200 may further include (and/or be in communication with) one or more non-transitory machine-readable storage mediums or storage devices (e.g., memory 2212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 2212. The server 2200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 1-4 and FIGS. 7-8. The memory 2212 may be a non-transitory machine-readable storage medium, processor-readable memory, and/or a computer-readable memory that stores the one or more computer-program products configured to cause the processor(s) 2202 to perform the functions described. In other embodiments, one or more of the functions described may be performed in hardware.

A set of these instructions and/or code might be stored on a non-transitory machine-readable storage medium, such as the memory 2212. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 2200 and/or might take the form of source and/or installable code, which, upon compilation and/or installation on the server 2200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
providing a customized communication interface overlay file to a plurality of user devices, wherein execution of the customized communication interface overlay file provides a customized communication interface overlay over a graphical interface being executed on the plurality of user devices;
making a first determination that when the customized communication interface overlay includes a first communication option, a first portion of a plurality of users select the first communication option;
making a second determination that when the customized communication interface overlay includes both the first communication option and a second communication option, a second portion of the plurality of users select the first communication option, wherein the second portion of users is smaller than the first portion of users, wherein the first determination and the second determination are made using call deflection statistics calculated on the plurality of user devices; and
increasing, in response to the first determination and the second determination, a proportion of instances of presenting the customized communication interface overlay that include the second communication option in order to reduce usage of the first communication option.

2. The computer-implemented method of claim 1, wherein the first communication option includes a call option.

3. The computer-implemented method of claim 1, wherein the second communication option includes a chat option.

4. The computer-implemented method of claim 1, wherein the first determination and the second determination are made using call deflection statistics based on a report of selections made by the plurality of users.

5. The computer-implemented method of claim 1, wherein the first determination and the second determination are transmitted to a third-party server.

6. The computer-implemented method of claim 1, wherein the first communication option and the second communication option are visually distinct.

7. A non-transitory machine-readable storage medium, including instructions embodied thereon, the instructions executable by one or more processors to perform operations including:
providing a customized communication interface overlay file to a plurality of user devices, wherein execution of the customized communication interface overlay file provides a customized communication interface overlay over a graphical interface being executed on the plurality of user devices;
making a first determination that when the customized communication interface overlay includes a first communication option, a first portion of a plurality of users select the first communication option;
making a second determination that when the customized communication interface overlay includes both the first communication option and a second communication option, a second portion of the plurality of users select the first communication option, wherein the second portion of users is smaller than the first portion of users, wherein the first determination and the second determination are made using call deflection statistics calculated on the plurality of user devices; and
increasing, in response to the first determination and the second determination, a proportion of instances of presenting the customized communication interface overlay that include the second communication option in order to reduce usage of the first communication option.

8. The non-transitory machine-readable storage medium of claim 7, wherein the first communication option includes a call option.

9. The non-transitory machine-readable storage medium of claim 7, wherein the second communication option includes a chat option.

10. The non-transitory machine-readable storage medium of claim 7, wherein the first determination and the second determination are made using call deflection statistics based on a report of selections made by the plurality of users.

11. The non-transitory machine-readable storage medium of claim 7, wherein the first determination and the second determination are transmitted to a third-party server.

12. The non-transitory machine-readable storage medium of claim 7, wherein the first communication option and the second communication option are visually distinct.

13. A system comprising:
one or more processors; and
one or more non-transitory machine-readable storage media containing instructions that, when executed on the one or more processors, cause the one or more processors to perform operations including:
providing a customized communication interface overlay file to a plurality of user devices, wherein execution of the customized communication interface overlay file provides a customized communication interface overlay over a graphical interface being executed on the plurality of user devices;
making a first determination that when the customized communication interface overlay includes a first communication option, a first portion of a plurality of users select the first communication option;
making a second determination that when the customized communication interface overlay includes both the first communication option and a second communication option, a second portion of the plurality of users select the first communication option, wherein the second portion of users is smaller than the first portion of users, wherein the first determination and the second determination are made using call deflection statistics calculated on the plurality of user devices; and
increasing, in response to the first determination and the second determination, a proportion of instances of presenting the customized communication interface overlay that include the second communication option in order to reduce usage of the first communication option.

14. The system of claim 13, wherein the first communication option includes a call option.

15. The system of claim 13, wherein the second communication option includes a chat option.

16. The system of claim 13, wherein the first determination and the second determination are made using call deflection statistics based on a report of selections made by the plurality of users.

17. The system of claim 13, wherein the first determination and the second determination are transmitted to a third-party server.

18. The system of claim 13, wherein the first communication option and the second communication option are visually distinct.

* * * * *